US008285065B2

(12) United States Patent
Yamazaki

(10) Patent No.: US 8,285,065 B2
(45) Date of Patent: Oct. 9, 2012

(54) IMAGE PROCESSING APPARATUS, IMAGE PROCESSING METHOD, AND COMPUTER PROGRAM PRODUCT FOR IMAGE PROCESSING

(75) Inventor: Akio Yamazaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1003 days.

(21) Appl. No.: 12/118,482

(22) Filed: May 9, 2008

(65) Prior Publication Data
US 2008/0279469 A1    Nov. 13, 2008

(30) Foreign Application Priority Data
May 10, 2007   (JP) ................................ 2007-125648

(51) Int. Cl.
*G06K 9/42* (2006.01)
*G06K 9/00* (2006.01)
(52) U.S. Cl. ........................ 382/254; 382/118
(58) Field of Classification Search .................. 382/254, 382/118
See application file for complete search history.

(56) References Cited

U.S. PATENT DOCUMENTS

| | | | |
|---|---|---|---|
| 5,717,377 A * | 2/1998 | Gao ............................... | 340/467 |
| 5,774,579 A | 6/1998 | Wang et al. | |
| 6,035,074 A * | 3/2000 | Fujimoto et al. ............. | 382/282 |
| 7,092,573 B2 | 8/2006 | Luo et al. | |
| 7,154,503 B2 | 12/2006 | Yuan | |
| 7,526,193 B2 * | 4/2009 | Minato et al. ................. | 396/123 |
| 7,609,894 B2 | 10/2009 | Zaklika et al. | |
| 7,716,157 B1 * | 5/2010 | Bourdev et al. ....................... | 1/1 |
| 2004/0170337 A1 * | 9/2004 | Simon et al. ................... | 382/254 |
| 2004/0208388 A1 | 10/2004 | Schramm et al. | |
| 2005/0110802 A1 | 5/2005 | Avinash | |
| 2005/0180659 A1 | 8/2005 | Zaklika et al. | |
| 2006/0098104 A1 * | 5/2006 | Fujii et al. ................... | 348/222.1 |
| 2007/0071316 A1 * | 3/2007 | Kubo ............................. | 382/162 |
| 2009/0096808 A1 | 4/2009 | Winn et al. | |

FOREIGN PATENT DOCUMENTS
EP     0758774 A2     2/1997
(Continued)

OTHER PUBLICATIONS

Wilmot Li et al., "Interactive image-based exploded view diagrams" Proceedings, Graphics Interface, http://portal.acm.org/citation.cfm?id=1006058.1006083>, pp. 203-212, May 2004.

(Continued)

Primary Examiner — Wenpeng Chen
(74) Attorney, Agent, or Firm — DLA Piper LLP (US)

(57) ABSTRACT

To improve modification result where areas targeted for modification overlap, an image processing apparatus is provided. The image processing apparatus has a modification area establishing unit capable to establish a plurality of modification areas on a target image by analyzing the target image; an overlap detecting unit that detects overlapping of the plurality of modification areas; and a modification processing unit that modifies an image within a partial area including an overlapping portion of the plurality of modification areas in a reduced modification level in the case that the overlapping is detected by the overlap detecting unit, the reduced modification level being smaller than a modification level used in the case that the overlapping is not detected, the partial area belonging to at least one of the plurality of modification areas.

12 Claims, 32 Drawing Sheets

FOREIGN PATENT DOCUMENTS

| | | |
|---|---|---|
| EP | 1318475 A1 | 6/2003 |
| EP | 1471462 A1 | 10/2004 |
| EP | 1826723 A1 | 8/2007 |
| JP | 2004-318204 | 11/2004 |
| WO | 2006107326 A1 | 10/2006 |

OTHER PUBLICATIONS

European search report dated Aug. 5, 2010 for corresponding European application 08251635.2 lists the references above.

* cited by examiner

BEFORE MODIFICATION PROCESS

AFTER MODIFICATION PROCESS
(FIRST EMBODIMENT)

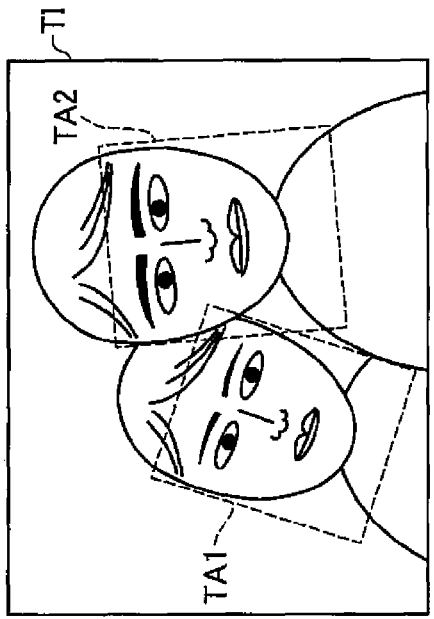
Fig.12A
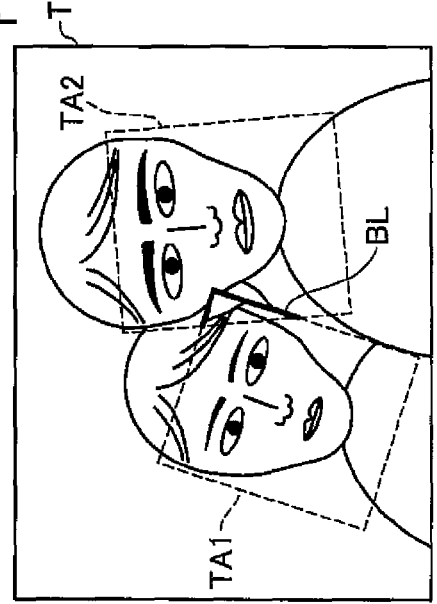
Fig.12C (WITHOUT MODIFICATION OF OVERLAPPING SUB-AREAS (FIRST EMBODIMENT))
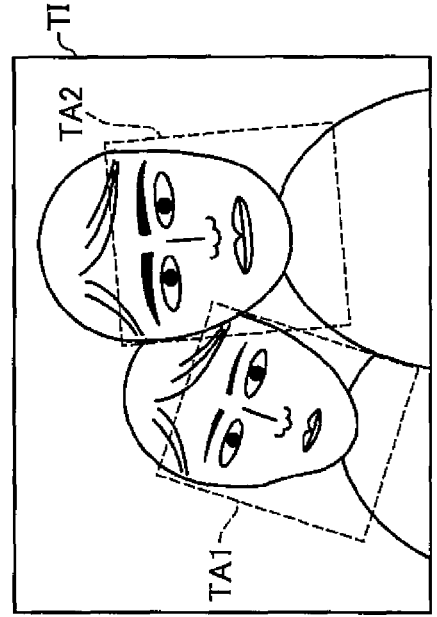
Fig.12B (WITH MODIFICATION OF OVERLAPPING SUB-AREAS (COMPARATIVE EXAMPLE))

|     | H  | V  |
|-----|----|----|
| D11 | 7  | 14 |
| D21 | 7  | 14 |
| D31 | -7 | 14 |
| D41 | -7 | 14 |
| D12 | 7  | 0  |
| D22 | 0  | 0  |
| D32 | 0  | 0  |
| D42 | -7 | 0  |

IMAGE PROCESSING APPARATUS, IMAGE PROCESSING METHOD, AND COMPUTER PROGRAM PRODUCT FOR IMAGE PROCESSING

CROSS-REFERENCE TO RELATED APPLICATIONS

The present application claims the priority based on Japanese Patent Application No. 2007-125648 filed on May 10, 2007, the disclosure of which is hereby incorporated herein by reference in its entirety.

BACKGROUND

1. Field of the Invention

The present invention relates to image processing technique for modifying an area on a target image.

2. Description of the Related Art

In a certain image processing apparatus, an image processing for modifying digital image is performed. For example, JP2004-318204A discloses an image processing method for modifying the shape of the face. The image processing method entails setting certain areas of an image of a face (specifically, areas representing images of the cheeks) as correction areas, then dividing these correction areas into a plurality of sub-areas according to a prescribed pattern, and either enlarging or reducing the image by a ratio which has been set on an individual sub-area basis.

In this conventional image processing method for image modification, the correction areas on which image modification is performed are predetermined as the areas representing images of the cheeks. Accordingly, in under normal circumstances, these correction areas do not overlap. Therefore, no consideration has been given to instances in which correction areas targeted for modification might overlap. This problem is not limited to image processing which involves facial correction. Such a problem may occur in any image processing which involves correcting one or more portions of an image.

SUMMARY

An object of the present invention is to provide a technique to improve modification result where areas targeted for modification overlap.

According to an aspect of the present invention, an image processing apparatus is provided. The image processing apparatus comprises a modification area establishing unit capable to establish a plurality of modification areas on a target image by analyzing the target image; an overlap detecting unit that detects overlapping of the plurality of modification areas; and a modification processing unit that modifies an image within a partial area including an overlapping portion of the plurality of modification areas in a reduced modification level in the case that the overlapping is detected by the overlap detecting unit, the reduced modification level being smaller than a modification level used in the case that the overlapping is not detected, the partial area belonging to at least one of the plurality of modification areas.

With this arrangement, since the modification level of the partial area which includes the overlapping portion is reduced, the influence of individual modification processes for the overlapping portion may be reduced, even where the respective modification processes for modifying the modification areas are carried out on the overlapping portion. This may prevents unnatural modification in the image caused by carrying out modification processes on the overlapping portion repeatedly and enables improvement of the modification result.

The modification processing unit may be configured to carry out modification of the image within the at least one of the plurality of modification area through modification of a plurality of sub-areas generated by dividing the at least one of the plurality of modification areas, and the partial area may constitute at least a part of the plurality of sub-areas overlying the overlapping portion.

With this arrangement, the modification level of at least a part of sub-areas which overlie overlapping portion can be reduced by setting the modification level on an individual sub-area basis. Accordingly, reduction of the modification level of the partial area becomes easier.

The partial area may include an area generated through further division of an overlapping sub-area overlying the overlapping portion.

With this configuration, the partial area can be made even smaller by dividing the overlapping sub-area which overlie overlapping portion. It is accordingly possible to reduce the size of the range in the modification area where the modification level is reduced.

The modification processing unit may be configured to set the reduced modification level of the partial area to zero so as not to modify the partial area.

With this arrangement, modification is not performed on the partial area, and thus in overlapping portion the image is maintained as prior to the modification process. This may prevents unnatural modification in the image caused by carrying out modification processes on the overlapping portion repeatedly and enables improvement of the modification result.

For the target image containing a plurality of human faces, the modification area establishing unit may establish an area including images of a plurality of organs of each human face as each of the plurality of modification areas.

Where modification areas include a plurality of organs of the human face, the modification areas tend to overlap. Moreover, a human face typically represents an area of high interest within the image. For this reason, when carrying out a modification process on a human face it is preferable for the modification result to be more natural in appearance, thus making it more effective to reduce the modification level for the overlapping portion.

For the purpose of carrying out the modification process, the image processing apparatus for performing modification of images may comprise a modification area establishing unit which establishes at least a partial area on a target image as a modification area; a modification area dividing unit which positions a plurality of dividing points within the modification area and interconnects the dividing points by straight lines to divide the modification area into a plurality of sub-areas; and a modification processing unit which carries out modification of the image within the modification area by moving the position of at least one of the dividing points and modifying the sub-area.

In this image processing apparatus, a plurality of dividing points are positioned within a modification area which is established on the target image, and the modification area is then divided into a plurality of sub-areas using straight lines which interconnect the dividing points. The modification process of the image within the modification area is executed by moving the position of the dividing points and modifying the sub-area. Accordingly, with this image processing device, image modification can be carried out simply by positioning dividing points within the modification area and then moving the positioned dividing points; and image processing which involves image modification corresponding to various different modes of modification can be accomplished easily and efficiently.

The image processing apparatus may further comprise a modification mode setting unit which selects one of a plurality of prescribed modification types to set a modification type for implementation in modification of the image within the modification area; and the modification area dividing unit may position the plurality of dividing points in accordance with a prescribed arrange pattern associated with the selected modification type.

In this way, positioning of the dividing points, i.e. division of the modification area, can be carried out in a manner appropriate to a number of different modification types such as, for example, a modification type for sharpening the face or a modification type for enlarging the eyes, thereby making it even easier to achieve image processing for the purpose of image modification which corresponds to different types of modification.

In the image processing apparatus, the modification mode setting unit may select one of a plurality of prescribed level of modification to establish a level of modification for implementation in modification of the image within the modification area; and the modification processing unit may move the positions of the dividing points in accordance with a prescribed direction and distance of movement pre-associated with that particular combination of the set modification type and level of modification.

With this arrangement, once the modification type and level of modification are set, image modification may be executed according to that particular combination, thereby making it even easier to achieve image processing for the purpose of image modification.

In the image processing apparatus, the modification mode setting portion may include an instruction acquiring unit for acquiring, for at least one of the dividing points, a user instruction in relation to the direction and distance of movement of the dividing point; and the modification processing unit may move the positions of the dividing points in accordance with the acquired user instruction.

With this arrangement it is easy to accomplish image processing for the purpose of image modification using a mode which more closely approximates user preference.

In the image processing apparatus, the modification area establishing unit may establish the modification area such that an image of at least part of a face is included in the modification area.

In this way, the image processing for modifying facial image corresponding to various different modes of modification can be accomplished easily and efficiently.

In the image processing apparatus, the modification area dividing unit may position the plurality of dividing points such that at least one group of the dividing points are positioned at mutually symmetrical locations with respect to a prescribed reference line; and the modification processing portion may move the at least one group of dividing points while maintaining their mutually symmetrical positional relationship with respect to the prescribed reference line.

In this way, image modification is carried out in a symmetric manner with respect to a prescribed reference line, making it possible to accomplish image processing for the purpose of image modification affording a good facial image with a more natural appearance.

In the image processing apparatus, the modification processing unit may not to perform modification for at least one of the sub-areas.

This allows carrying out of the intended image modification without appreciably changing the impression of a face, and to achieve image processing for the purpose of image modification affording a good facial image with a more natural appearance.

In the image processing apparatus, the modification processing unit may omit to perform modification of the sub-areas which include the eyes.

By omitting to perform modification of the sub-areas which include the eyes in this way, it is possible to achieve image processing for the purpose of image modification affording a good facial image with a more natural appearance.

The image processing apparatus may further comprise a facial area detecting unit which detects a facial area representing an image of a face on the target image; and the modification area establishing unit may establish the modification area on the basis of the detected facial area.

With this arrangement, for image processing of a modification area which is established on the basis of a facial area detected from a target image, image processing for the purpose of image modification corresponding to various different modes of modification can be accomplished easily and efficiently.

The image processing apparatus may further comprise a printing unit for printing the target image which undergoes modification of the image within the modification area.

With this arrangement, an image which undergoes image modification corresponding to various different modes of modification can be printed out easily and efficiently.

The present invention may be reduced to practice in various modes, for example, an image processing method and apparatus; an image modification method and apparatus; an image correction method and apparatus; a computer program for carrying out the functions of such a method and apparatus; a recording medium having such a computer program recorded thereon; a data signal containing such a computer program and embodied in a carrier wave, and so on.

These and other objects, features, aspects, and advantages of the present invention will become more apparent from the following detailed description of the preferred embodiments with the accompanying drawings.

BRIEF DESCRIPTION OF THE DRAWINGS

FIGS. 12A through 12C are illustrations depicting the results of the modification process in the comparative example and in the first embodiment;

DESCRIPTION OF THE PREFERRED EMBODIMENT

A. First Embodiment

Figure 1:
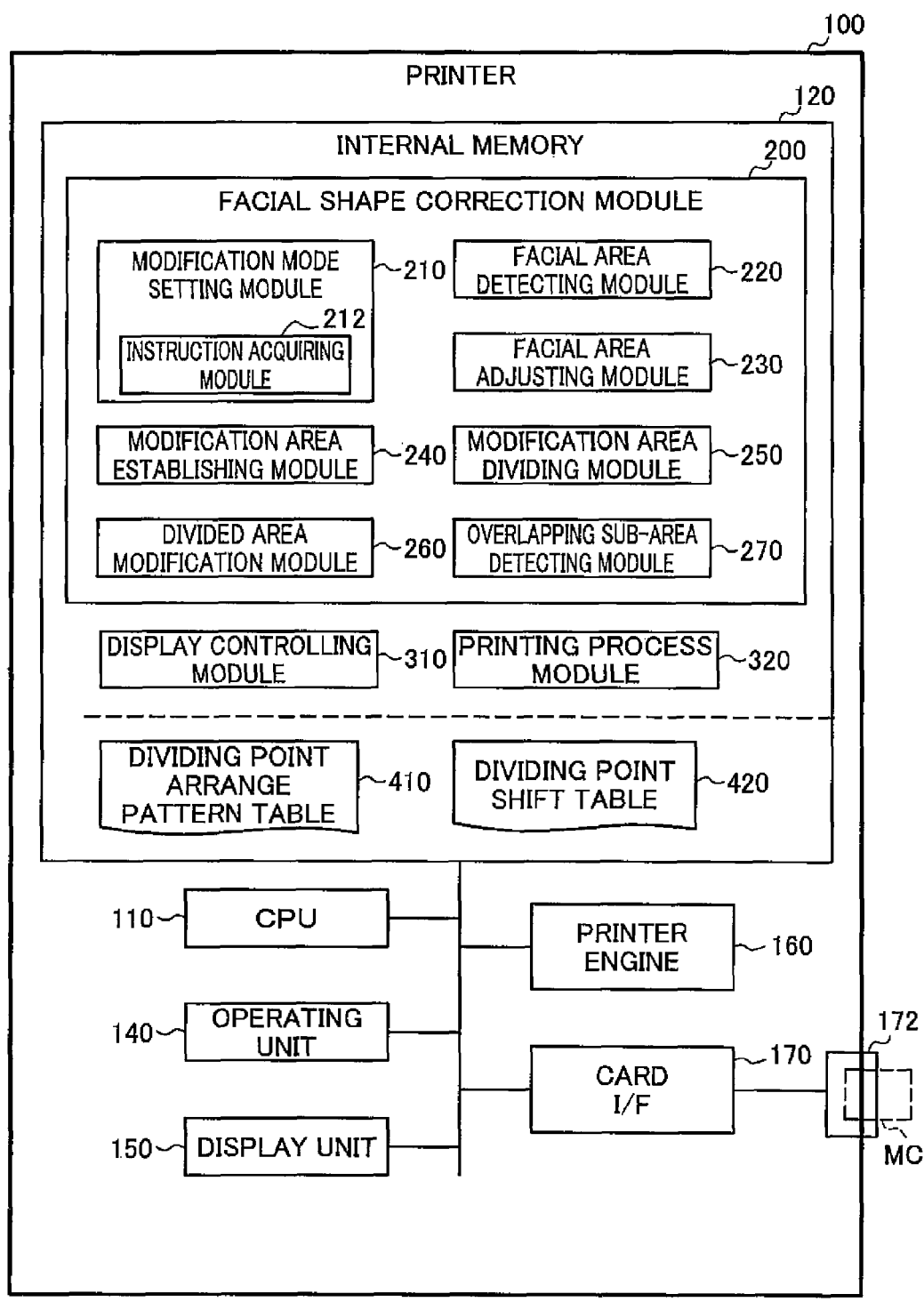
FIG. 1 is an illustration schematically depicting the configuration of a printer in which an image processing apparatus is implemented as an embodiment of the present invention.

FIG. 1 is an illustration schematically depicting the configuration of a printer 100 in which an image processing apparatus is implemented as an embodiment of the present invention. The printer 100 is a color ink-jet printer compatible with so-called direct printing whereby images are printed on the basis of image data obtained from a memory card MC or other medium. The printer 100 includes a CPU 110 for controlling the various components of the printer 100, an internal memory 120 composed of ROM and RAM for example, a operating unit 140 composed of buttons or a touch panel, a display unit 150 composed of a liquid crystal display, a printer engine 160, and a card interface (card I/F) 170. The printer 100 may include an interface for data communication with other devices (e.g. a digital still camera or personal computer). The components of the printer 100 are interconnected by a bus.

The printer engine 160 is a printing mechanism for carrying out printing on the basis of print data. The card interface 170 is an interface for exchanging data with a memory card MC inserted into a memory card slot 172. In the first embodiment, image data is stored as RGB data on the memory card MC, the printer 100 obtains image data stored on the memory card MC via the card interface 170.

The internal memory 120 stores a facial shape correction module 200, a display controlling module 310, and a printing process module 320. The facial shape correction module 200 is a computer program which runs on a prescribed operating system and carries out a facial shape correction process, discussed later. The display controlling module 310 is a display driver to control the display unit 150 and displays on the display unit 150 operation menus, notification messages, and so on. The printing process module 320 is a computer program to generate print data from image data, to control the printer engine 160, and to execute printing of the image based on the print data. The CPU 110 loads these programs from the internal memory 120 and executes them to realize the functions of the various modules.

The facial shape correction module 200 includes as program modules a modification mode setting module 210, a facial area detecting module 220, a facial area adjusting module 230, a modification area establishing module 240, a modification area dividing module 250, a divided area modification module 260, and an overlapping sub-area detecting module 270. The modification mode setting module 210 includes an instruction acquiring module 212. As will be discussed later, modification of images is carried out by the modification area dividing module 250, the divided area modification module 260, and the overlapping sub-area detecting module 270. For this reason, the modification area dividing module 250, the divided area modification module 260, and the overlapping sub-area detecting module 270 may also be referred as the "modification processing module" collectively. The functions of these modules will be discussed later.

In addition to the program modules, a dividing point arrange pattern table 410 and a dividing point shift table 420 are stored in the internal memory 120. The specifics of the dividing point arrange pattern table 410 and the dividing point shift table 420 will be described in detail later in the discussion of the facial modification process.

Figure 2:
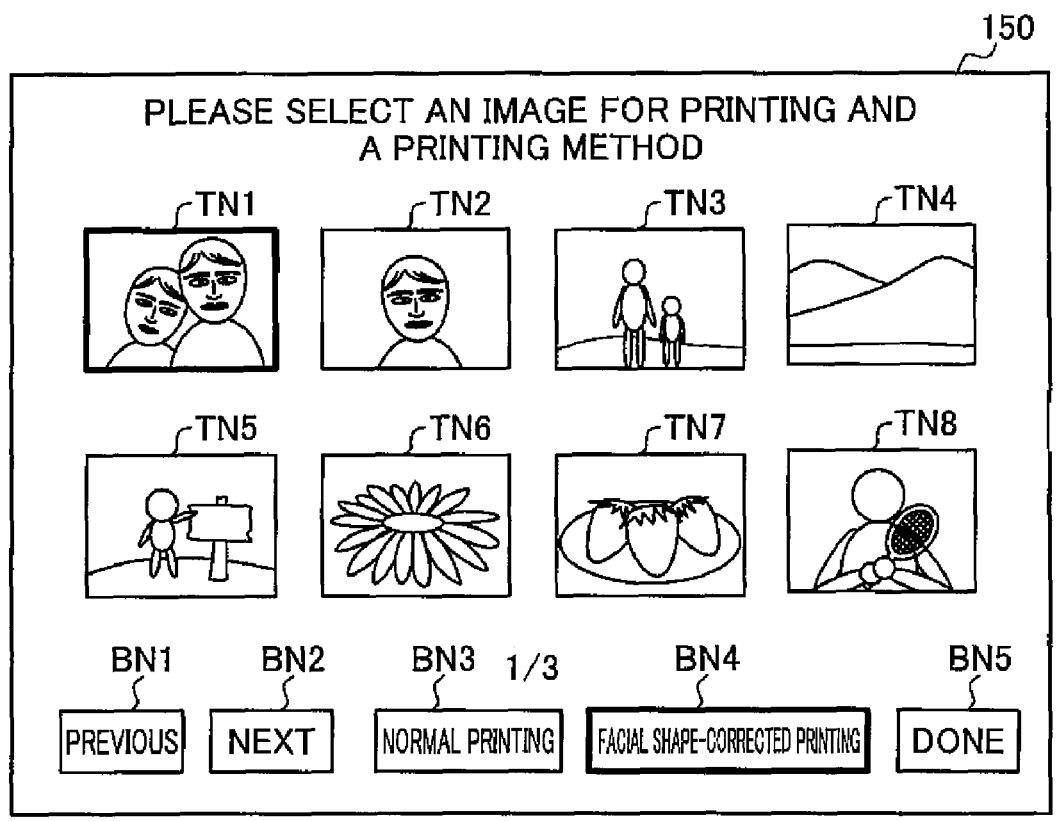
FIG. 2 is an illustration depicting an example of a user interface which includes the image listing.

The printer 100 carries out printing of images on the basis of the image data stored on the memory card MC. When the memory card MC is inserted into the card slot 172, the display controlling module 310 displays on the display unit 150 a user interface which includes an image listing of the images stored on the memory card MC. FIG. 2 is an illustration depicting an example of a user interface which includes the image listing. In the first embodiment, the image listing is generated using thumbnail images included in the image data (image files) stored on the memory card MC. The user interface depicted in FIG. 2 displays eight thumbnail images TN1 through TN8, and five buttons BN1 through BN5.

If the user selects one (or several) of the images in the user interface shown in FIG. 2 and then operates a "NORMAL PRINTING" button BN3, the printer 100 executes a normal printing process to print the selected image in ordinary way. If on the other hand the user selects one (or several) of the images in the user interface and then operates a "FACIAL SHAPE-CORRECTED PRINTING" button BN4, the printer 100 executes a facial shape-corrected printing process for the selected image(s) whereby facial shape in the image is corrected, and the corrected image then printed. In the example of FIG. 2, the thumbnail image TN1 is selected, and the "FACIAL SHAPE-CORRECTED PRINTING" button BN4 is operated. Accordingly, the printer 100 corrects facial shape in the image corresponding to thumbnail image TN1 and print the corrected image.

Figure 3:
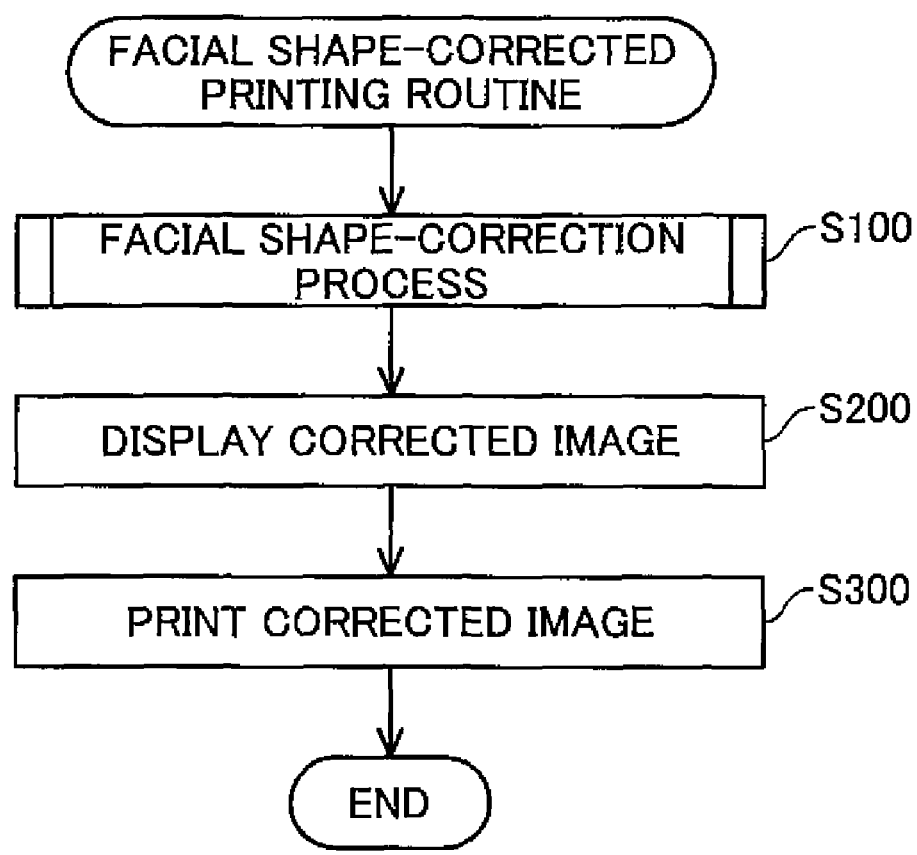
FIG. 3 is a flowchart of the facial shape-corrected printing routine executed when facial shape-corrected printing is carried out in the printer.

FIG. 3 is a flowchart of the facial shape-corrected printing routine executed when facial shape-corrected printing is carried out in the printer 100. In Step S100, the facial shape correction module 200 (FIG. 1) executes a facial shape correction process. The facial shape correction process is a process for correcting at least a part of facial shape (e.g. the outline of the face or the shape of the eyes) in an image. Parts of the face such as the eyes, nose are also referred to as organs generally.

Figure 4:
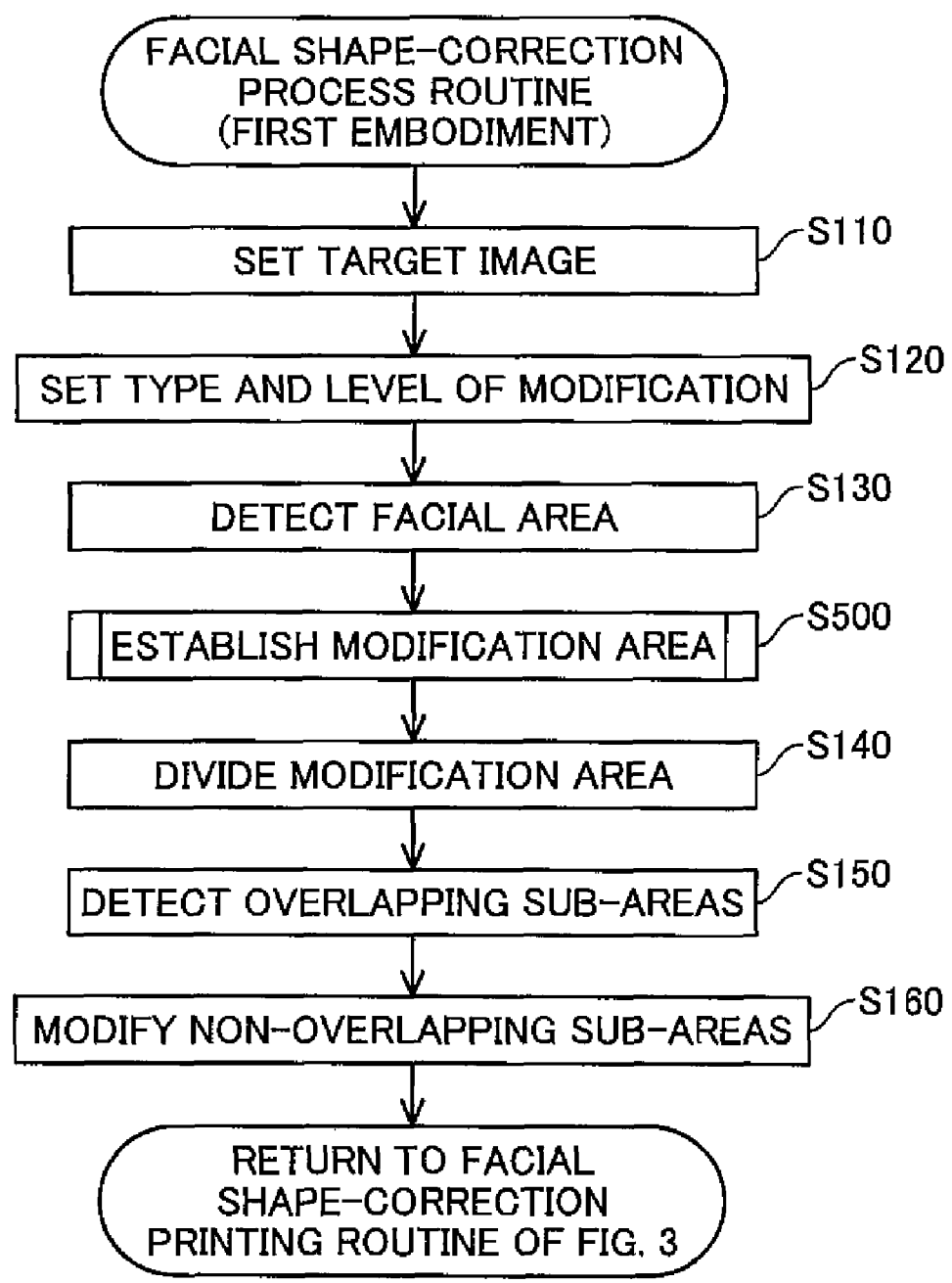
FIG. 4 is a flowchart showing the facial shape correction process routine in the first embodiment.

FIG. 4 is a flowchart showing the facial shape correction process routine executed in Step S100 of FIG. 3. In Step S110, the facial shape correction module 200 (FIG. 1) sets a target image which is the target for the facial shape correction process. The facial shape correction module 200 sets as the target image the image which corresponds to the thumbnail image TN1 selected by the user from the user interface shown in FIG. 2. The image data of the target image set in this way is obtained from the memory card MC by the printer 100 via the card interface 170 and stored in a prescribed area in the internal memory 120. Hereinafter, image data which has been obtained from the memory card MC and stored in the internal memory 120 of the printer 100 in this way is also referred to as "source image data." The image represented by the source image data is also referred to as the "source image."

In the first embodiment, the target image is set according to the result of user selection from the user interface shown in FIG. 2. It is also acceptable to set the target image by some other method instead. For example, the target image may be set on the basis of information such as Exif information stored in the image data or on the basis of the result of scene determination of image data. In latter case, an image which includes a face (facial image) is extracted from among a plurality of images stored on the memory card MC, and the extracted facial image then set as the target image. Alternatively, the user may select one or several facial images from a user interface which includes an image listing of the extracted facial images, and a target image or images then set according the selection by the user. If multiple images are set as target images, facial shape correction may be performed on the multiple target images at the same time, or facial shape correction may be carried out on the multiple images according to a priority sequence, which is assigned to the multiple of images.

In Step S120 (FIG. 4), the modification mode setting module 210 (FIG. 1) set the type of image modification and the level of image modification for the facial shape correction. The modification mode setting module 210 instructs the display controlling module 310 to display on the display unit 150 a user interface for the setting the type and level of image modification. The user specifies the type and level of image modification through the user interface. The modification mode setting module 210 determines the user's specification, and sets the type and level of image modification to be used for the modification process.

Figure 5:
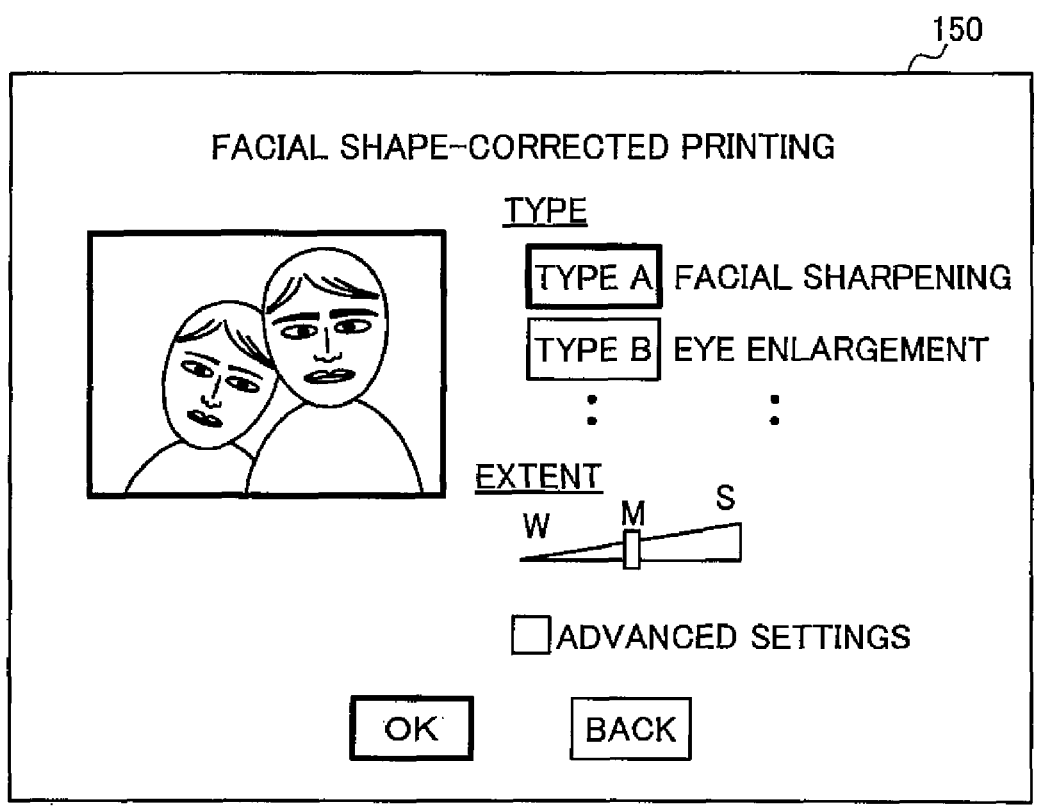
FIG. 5 is an illustration depicting an example of a user interface for setting the type and level of image modification.

FIG. 5 is an illustration depicting an example of a user interface for setting the type and level of image modification. As shown in FIG. 5, this user interface includes an interface for setting image modification type. In the first embodiment, there are a plurality of preestablished choices, for example, a "TYPE A" modification type for sharpening facial shape, and a "TYPE B" modification type for enlarging the shape of the eyes. The user specifies an image modification type through this interface. The modification mode setting module 210 then sets the image modification type specified by the user, as the image modification type to be used in actual processing.

The user interface shown in FIG. 5 also includes an interface for setting the level (extent) of image modification. As shown in shown in FIG. 5, in the first embodiment the three levels Strong (S), Medium (M), and Weak (W) are the preestablished choices for the extent of image modification. The user specifies level of image modification through this interface. The modification mode setting module 210 then sets the level of image modification specified by the user as the level of image modification to be used in actual processing. A checkbox provided in the user interface may be checked when the user wishes to make advanced settings for modification mode.

For the purposes of the following discussion, it is assumed that the "TYPE A" modification type for sharpening facial shape is set as the type of image modification, that the "Medium" extent is set as the level of image modification, and that the user does not wish to make any advanced settings.

In Step S130 of FIG. 4, the facial area detecting module 220 (FIG. 1) performs facial area detection in the target image. Here, a facial area refers to an image area on the target image which includes an image of at least part of a face. Detection of facial areas by the facial area detecting module 220 may be accomplished through the known facial detection method of pattern matching using a template as disclosed in JP 2004-318204 A, for example.

Figure 6:
FIG. 6 is an illustration depicting exemplary results of facial area detection.

FIG. 6 is an illustration depicting exemplary results of facial area detection. In the example of FIG. 6, the target image TI includes two persons. Thus, through facial detection in Step S130, two facial areas FA1, FA2 corresponding to the two persons are detected from the target image TI. As shown in FIG. 6, these facial areas are areas of rectangular shape each of which includes images of eyes, mouth, and nose.

In the event that no facial area is detected during facial area detection in Step S130, the failure of facial area detection is notified to the user through the display unit 150. In this case, it is acceptable to carry out normal printing unaccompanied by facial shape correction. Alternatively, the facial area detection process using a different facial detection method may be carried out.

In Step S130, the faces are detected from the target image through pattern matching using a template. Typically, detail of the orientation of the face as a whole or of parts of the face (the eyes, nose, etc.) such as the location and the tilt (angle) is not detected by the known facial detection methods such as the method of pattern matching using a template. With the known facial detection method a facial area within an image which is considered to include images of faces is detected in general.

In Step S500, the printer 100 establishes an area on which to perform the image modification process (modification area) for the facial shape correction on the basis of detected facial area. Specifically, the modification area is established by carrying out location and tilt adjustment for the facial area detected in Step S130, so as to achieve preferable facial shape correction with a natural appearance. By establishing the modification area in this way, facial image, which typically draw the observer's attention, is prevented from being modified to an unnatural appearance due to the relationship of the established modification area, and the location and angle of the facial images. The method of establishing the modification area will be discussed in more detail in the description of establishment of the modification area, to follow later.

Figure 7:
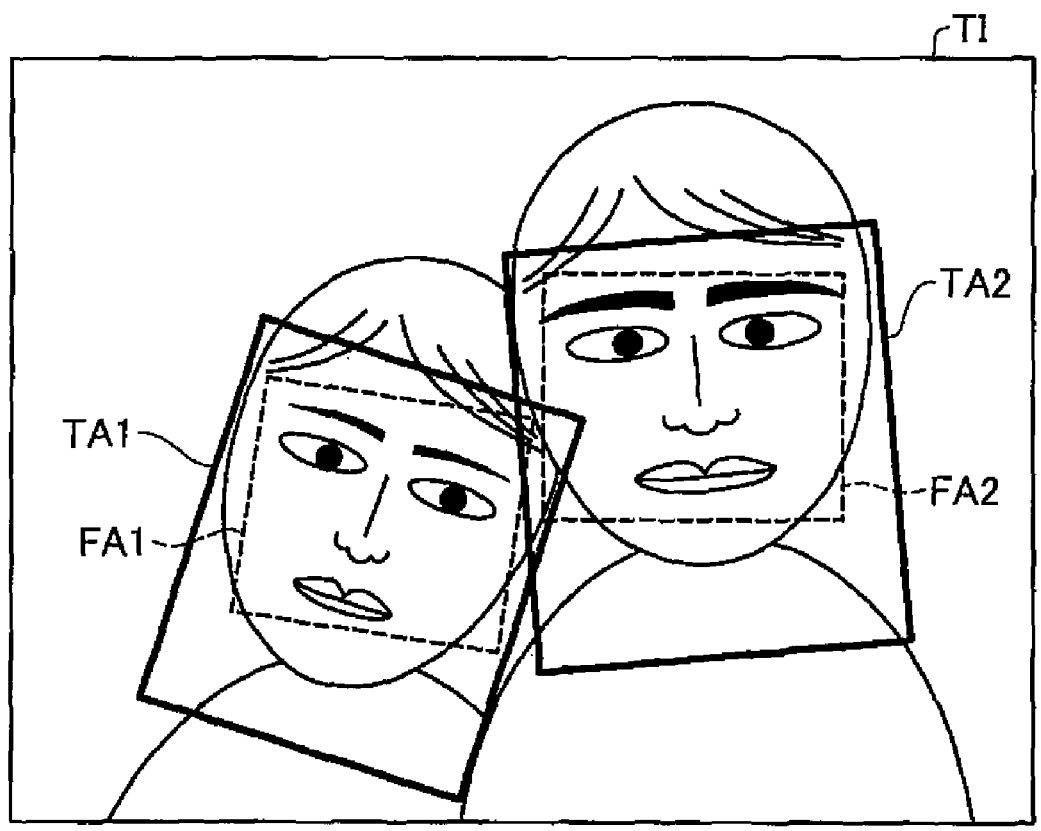
FIG. 7 is an illustration depicting results of establishing modification areas.

FIG. 7 is an illustration depicting results of establishing modification areas in Step S500. The broken lines in FIG. 7 indicate the two facial areas FA1, FA2 detected from the target image TI in Step S130. The heavy lines in FIG. 7 indicate modification areas established respectively for the two facial areas FA1, FA2. As shown in FIG. 7, in Step S500, two modification areas TA1, TA2 which correspond respectively to these two facial areas FA1, FA2 are established.

In the first embodiment, the modification areas are established as areas of rectangular shape. However, the shape of the modification areas is not limited to rectangular shape. The modification area may be established in some other shape instead (e.g. oval or rhombus).

In the first embodiment, the modification mode is set in Step S120 prior to facial detection (Step S130 of FIG. 4). The modification mode may also be set by performing a further process similar to Step S120, subsequent either to Step S130 or to Step S500. By making the modification mode settable subsequent to facial detection in Step S130 in this way, it is possible to dispense with the facial detection process in the case that the modification mode set in Step S120 does not meet the user's preference and the modification mode is reset.

Figure 8A:
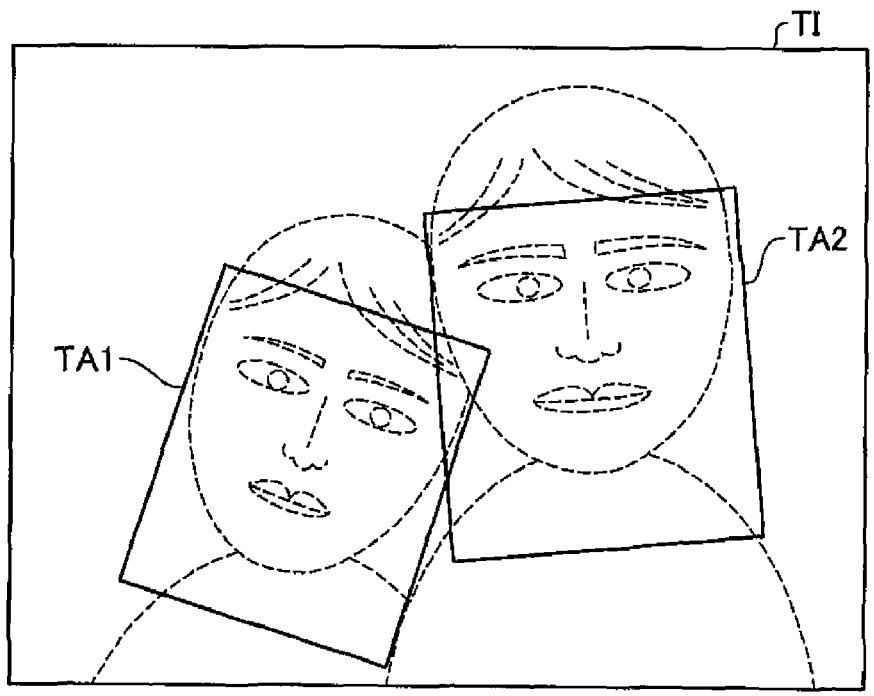
FIGS. 8A and 8B are illustrations of the two modification areas respectively divided into sub-areas.
Figure 8B:
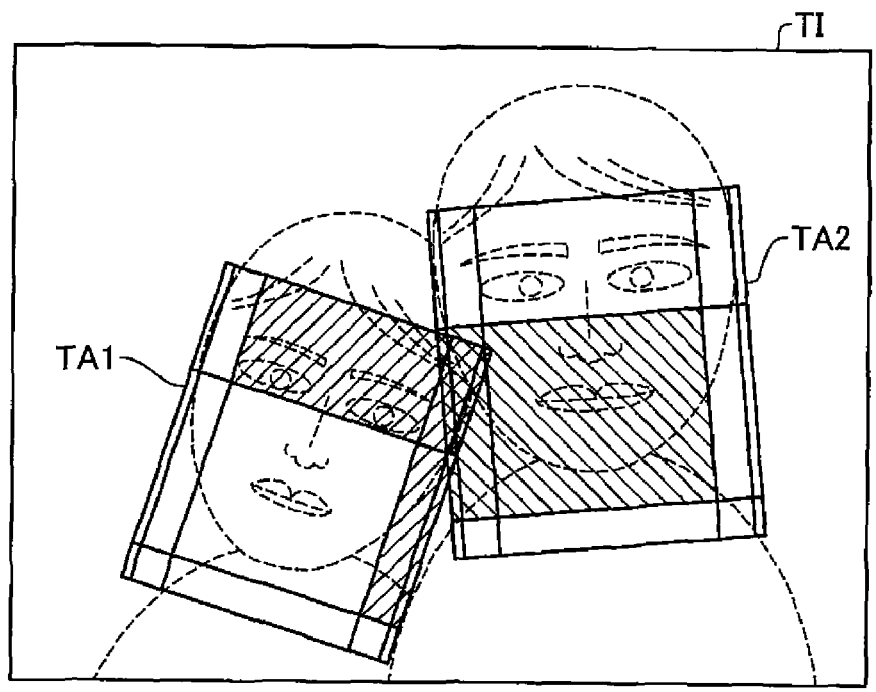

In Step S140 of FIG. 4, dividing points (discussed later) are arranged in the two respective modification areas TA1, TA2 established in Step S140 of FIG. 4, and each of the modification areas TA1, TA2 is divided into 15 sub-areas of rectangular shape. FIGS. 8A and 8B are illustrations of the two modification areas TA1, TA2 established in Step S500 of FIG. 4, shown respectively divided into sub-areas. Division of the modification areas TA1, TA2 into sub-areas through arrangement of dividing points will be discussed in detail in the description of the mode of dividing point arrangement, to follow later.

FIG. 8A depicts the orientation of the two modification areas TA1, TA2 established in Step S500 of FIG. 4. FIG. 8B depicts the two modification areas TA1, TA2 divided into sub-areas in Step S140 respectively. As shown in FIG. 8A, the two modification areas TA1, TA2 established in Step S500 overlap one another. For this reason, of the sub-areas of TA1, the sub-areas with hatching in a direction from upper right to lower left overlap the modification area TA2. Meanwhile, the sub-areas of modification area TA2 with hatching in a direction from upper left to lower right overlap the modification area TA1. Hereinafter, such sub-areas which belong to a given modification area but which overlap another modification area is termed "overlapping sub-area." As is apparent from FIG. 8B, the respective overlapping sub-areas of the modification areas TA1, TA2 include overlapping sections of the modification areas TA1, TA2. Since the overlapping sub-area is an area which is a part of the modification area, the overlapping sub-area can also be termed as a "partial area."

In Step S150, from among the sub-areas belonging to the individual modification areas divided in Step S140, the overlapping sub-area detecting module 270 (FIG. 1) detects which of these sub-areas overlie other modification areas in the manner shown by the hatching in FIG. 8B. The decision as to whether a sub-area belonging to an individual modification area overlies another modification area can be made using various types of algorithms for determining if overlap of planar figures exists. For example, the decision could be made by determining whether the contour lines of a sub-area and another sub-area intersect one another. The decision could also be made by determining whether a point within a sub-area is included in another sub-area. Or, if either the sub-area or the other sub-area is a convex polygon, the decision could be made by determining whether an apical point of the sub-area lies within the other sub-area, or whether an apical point of the other sub-area lies within the sub-area.

Next, in Step S160, the divided area modification module 260 (FIG. 1) performs the modification process on those respective sub-areas of the modification areas TA1, TA2 which do not overlie other modification areas (non-overlapping sub-areas). The modification process of the non-overlapping sub-areas is carried out by shifting the dividing points arranged when the modification area is divided into sub-areas. The specifics of the modification process will be discussed later in the description of modification of sub-areas.

If there are multiple modification areas TA1, TA2 as shown in FIGS. 8A and 8B, modification processes are performed on the source image for each of the individual modification areas. The modification processes performed on these multiple modification areas may be carried out through repeated execution of modification processes for individual modification areas, or through simultaneous execution of modification processes on the multiple modification areas.

Figure 9:
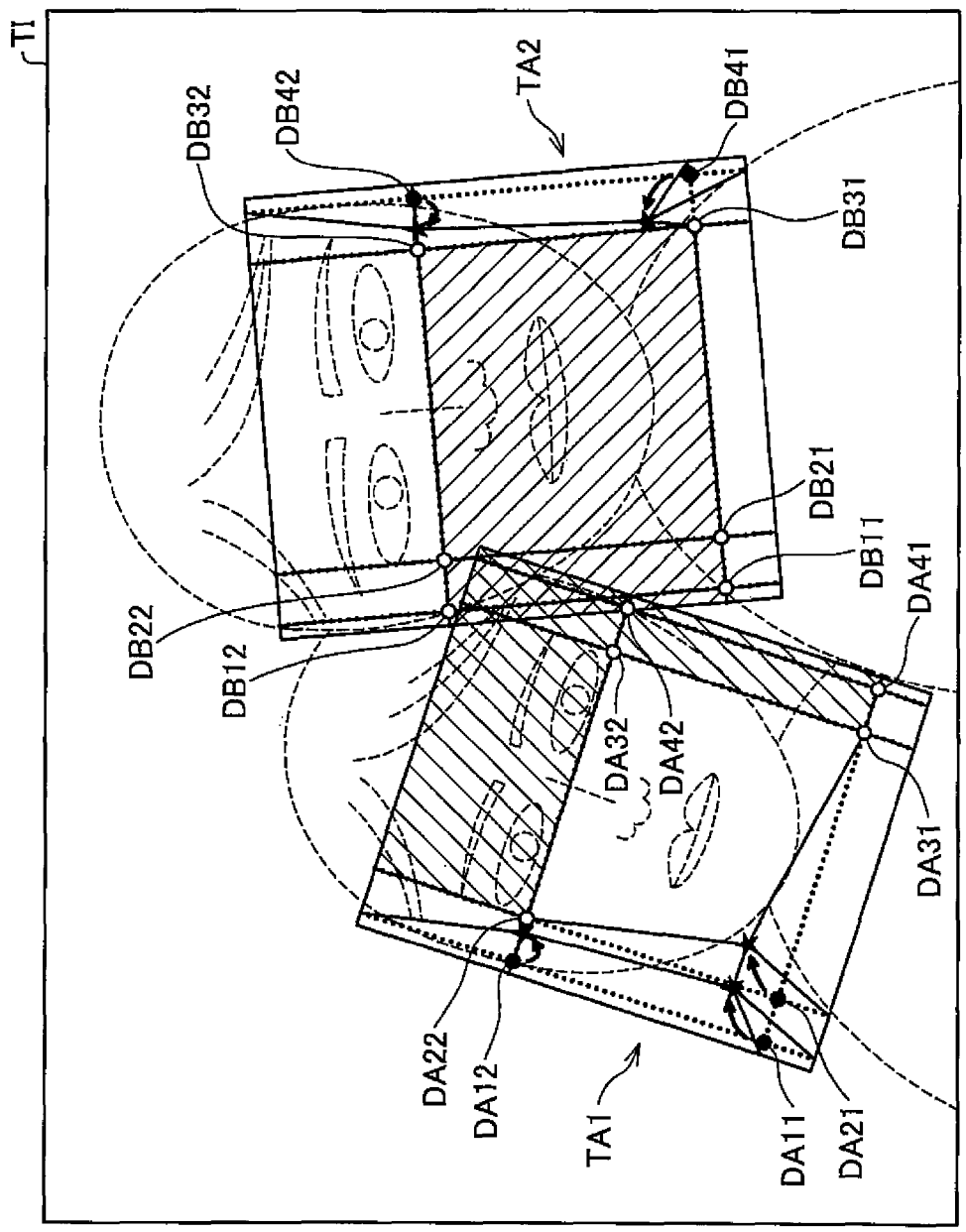
FIG. 9 is an illustration depicting modification of sub-areas belonging respectively to the two modification areas.

FIG. 9 is an illustration depicting modification of sub-areas belonging respectively to the two modification areas TA1, TA2 in Step S160. The black circles DA11, DA12, DA21 and the white circles DA22, DA31, DA32, DA41, DA42 inside the modification area TA1 indicate dividing points arranged when the modification area TA1 is divided into sub-areas. Similarly, the black circles DB41, DB42 and the white circles DB11, DB12, DB21, DB22, DB31, DB32 inside the modification area TA2 indicate dividing points arranged when the modification area TA2 is divided into sub-areas. In FIG. 9 as well, overlapping sub-areas within the modification areas TA1, TA2 are indicated by hatching.

In the example of FIG. 9, the dividing points which define apical points of overlapping sub-areas of the modification area TA1 are the five dividing points DA22, DA31, DA32, DA41, DA42 which are represented by white circles. Therefore, in the modification process of Step S160, these dividing points DA22, DA31, DA32, DA41, DA42 are not shifted. On the other hand, the dividing points DA11, DA12, DA21 represented by the black circles, which do not define apical points of overlapping sub-areas, are shifted from the locations indicated by the black circles to the locations indicated by the star symbols. By shifting the dividing points DA11, DA12, DA21 in this way the sub-area shown by the dotted lines is modified into the area shown by the solid lines.

Similarly, the dividing points which define apical points of overlapping sub-areas of the modification area TA2 are the six dividing points DB11, DB12, DB21, DB22, DB31, DB32 represented by the white circles. Therefore, in the modification process of Step S160, these dividing points DB11, DB12, DB21, DB22, DB31, DB32 are not shifted. On the other hand, the dividing points DB41, DB42 represented by the black circles, which do not define apical points of overlapping sub-areas, are shifted from the locations indicated by the black circles to the locations indicated by the star symbols. By shifting the dividing points DB41, DB42 in this way the sub-area shown by the dotted lines is modified into the area shown by the solid lines.

Figure 10A:
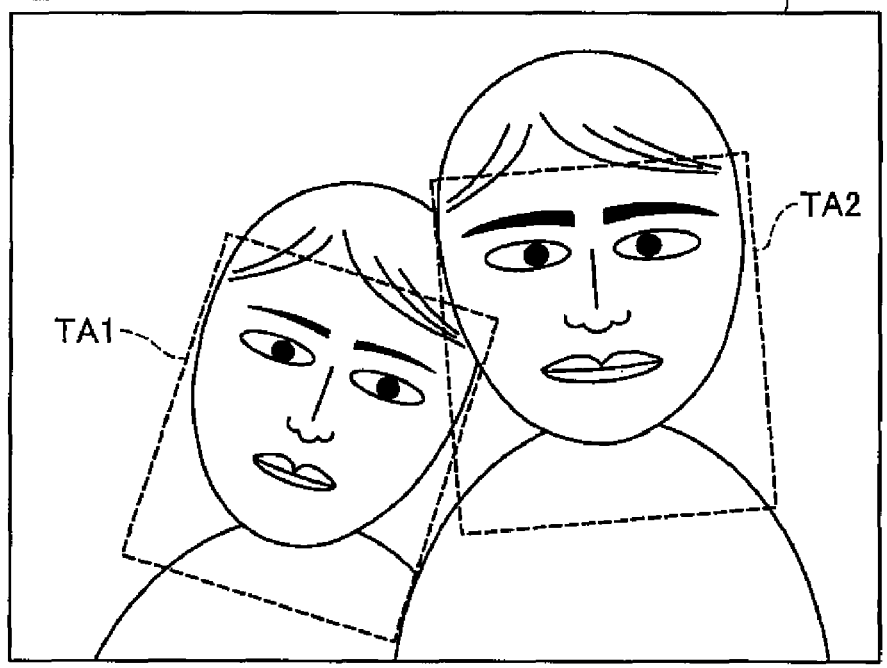
FIGS. 10A and 10B are illustrations depicting the results of the modification process in the first embodiment.
Figure 10B:
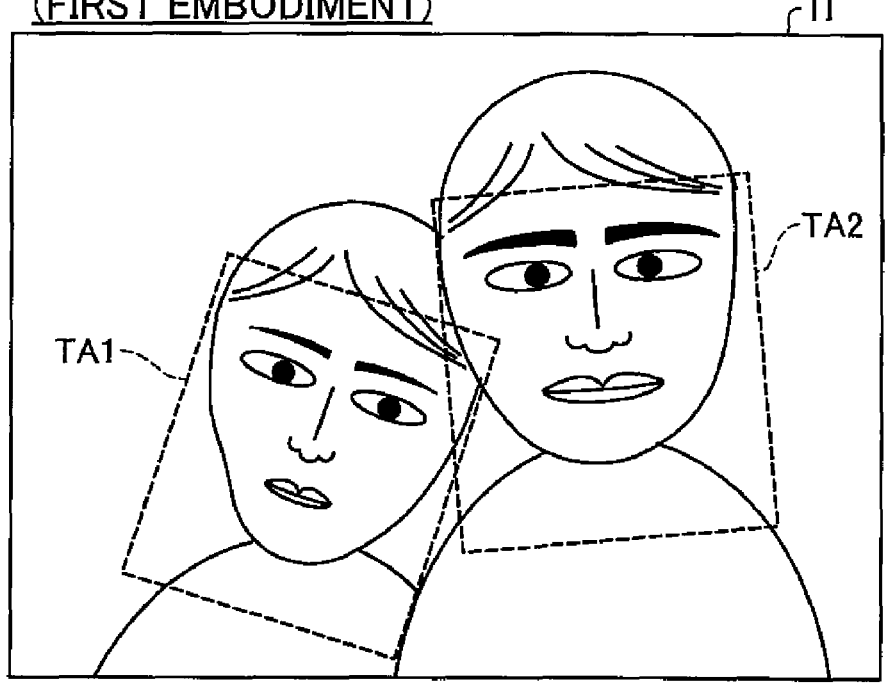

FIGS. 10A and 10B are illustrations depicting the results of the modification process in the first embodiment. FIG. 10A shows the target image TI prior to the modification process of Steps S140 through S160 of FIG. 4. FIG. 10B shows the target image TI after the modification process. As mentioned previously, there are areas of overlap of the two modification areas TA1, TA2 established respectively for the faces of the two persons in the target image TI. For this reason, only the respective non-overlapping sub-areas of the two modification areas TA1, TA2 are modified, while the overlapping sub-areas are not modified. Thus, as shown in FIG. 10B, a part of the face of the person on the left side contained in a non-overlapping sub-area within the modification area TA1, and the shape of the face becomes smaller. Also, a part of the face of the person on the right side contained in a non-overlapping sub-area within the modification area TA2 is modified, and the shape of the face becomes slightly smaller. On the other hand, the sections in which the two modification areas TA1, TA2 overlap are included in overlapping sub-areas. Accordingly, images in the overlapping sections of the modification areas TA1, TA2 are unchanged from the images prior to the modification process (FIG. 10A).

Figure 11:
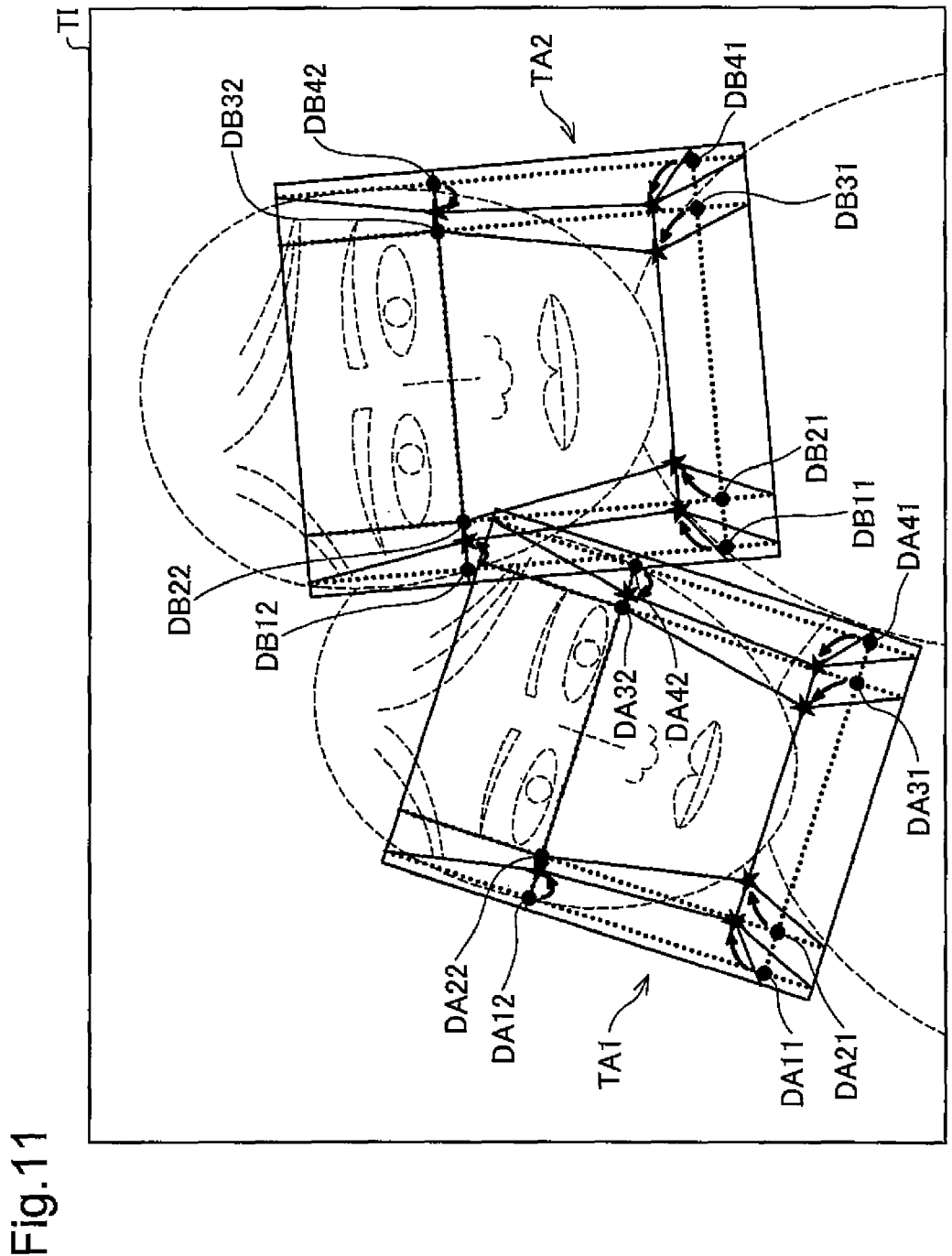
FIG. 11 is an illustration depicting the results of the modification process on both non-overlapping sub-areas and overlapping sub-areas.

FIG. 11 is an illustration depicting the results the modification process on both non-overlapping sub-areas and overlapping sub-areas, as a comparative example. Where the modification process is carried out on both non-overlapping sub-areas and overlapping sub-areas, all of the dividing points DA11 through DA42 and DB11 through DB42 of the modification areas TA1, TA2 are targeted for shifting. Thus, these dividing points DA11 through DA42 and DB11 through DB42 undergo respective shift to the locations indicated by the star symbols. In the example of FIG. 11, the type of image modification has been set to "TYPE A" modification type for sharpening facial shape, as shown in FIG. 5. In this case, since the modification process is carried out so that the size of the eyes does not change, the four dividing points DA22, DA32, DB22, and DB32 are not shifted.

FIGS. 12A through 12C are illustrations depicting the results of the modification process in the comparative example and in the first embodiment. In the comparative example, the modification process is carried out on both of the two overlapping modification areas TA1, TA2. FIG. 12A shows the target image TI prior to the modification processes (the source image). FIG. 12B shows the results of the modification process in the comparative example, in which the modification processes are carried out on overlapping sub-areas as well. FIG. 12C shows the results of the modification process of the first embodiment, in which the modification process is not carried out on overlapping sub-areas. As mentioned above, the image which appears in the modification areas subsequent to each of the modification processes is the result of modification process of the source image. For this reason, in the sections which overlap the two modification areas TA1, TA2, the results of initial modification process are overwritten the results of a later modification process. Thus, in the comparative example, in which the modification process is carried out on overlapping sub-areas as well, a discontinuous border line BL appears, as shown by the heavy line in FIG. 12B.

On the other hand, in the first embodiment, the modification process is not carried out on overlapping sub-areas, any discontinuous border is not appear in the modified image as shown in FIG. 12C. Thus, with the first embodiment, it is possible to prevent appearance of discontinuous border in the modified image and to prevent generation of an unnatural image as the modified image.

After the modification process of the non-overlapping sub-areas in Step S160 of FIG. 4, the process returns to the facial shape-corrected printing routine of FIG. 3.

Figure 13:
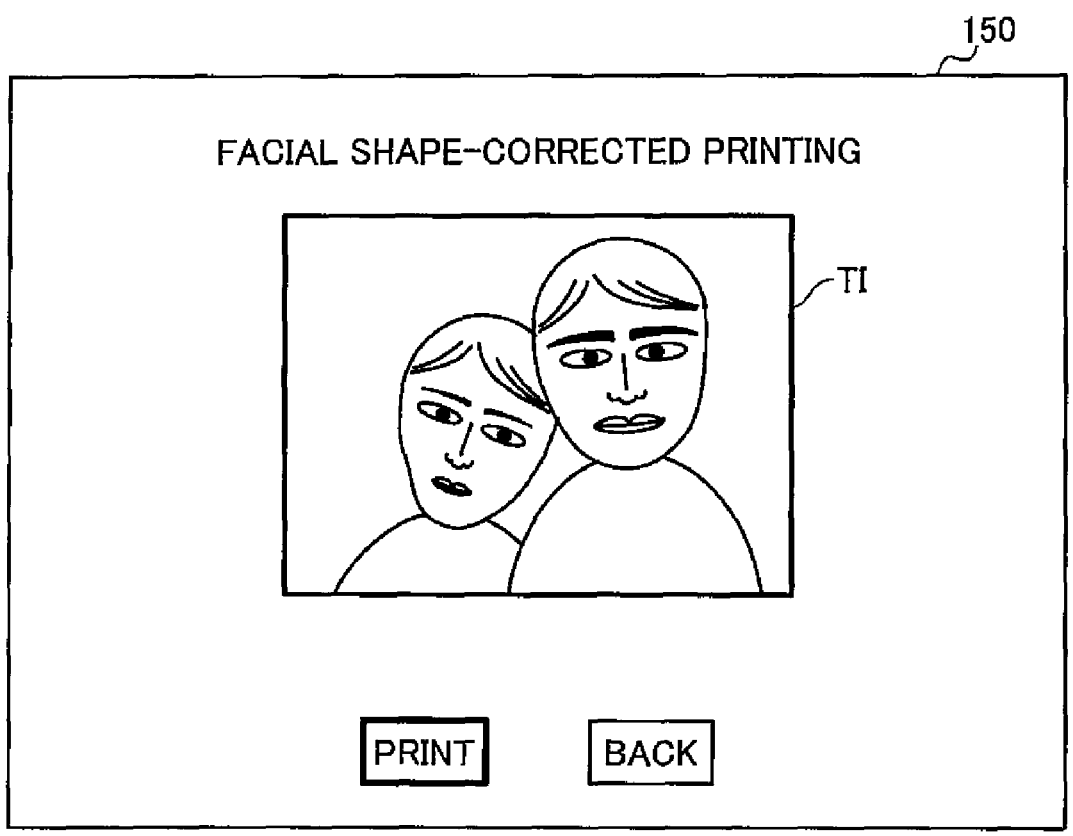
FIG. 13 is an illustration depicting an example of the display unit displaying a facial shape-corrected target image.

Once the process has returned from the facial shape correction process routine of FIG. 4, in Step S200 of FIG. 3, the modified image (corrected image) is displayed. Specifically, the facial shape correction module 200 (FIG. 1) instructs the display controlling module 310 to display the facial shape-corrected target image on the display unit 150. FIG. 13 is an illustration depicting an example of the display unit 150 displaying a facial shape-corrected target image TI. The user is able to check the results of correction from the facial shape-corrected target image TI which is displayed on the display unit 150. In the event that the user is not satisfied with the correction results, the user operates the "BACK" button. The user's operation causes the display unit 150 to display, for example, the screen for selecting modification type and modification degree shown in FIG. 5 for allowing the user to reset the modification type and modification level. On the other hand, if the user is satisfied with the correction results, the user operates the "PRINT" button. In response to the user's operation, the corrected image printing process described below commences. In the first embodiment, only the corrected image is displayed on the display unit 150. It is also possible to display both of the source image and the corrected image on the display unit 150 simultaneously.

In Step S300, the printing process module 320 (FIG. 1) controls the printer engine 160 and carries out printing of the facial shape-corrected target image. The printing process module 320 performs processes such as resolution conversion and halftoning of the image data which represents the facial shape-corrected target image, and generates print data. The print data generated thereby is supplied from the printing process module 320 to the printer engine 160, whereupon the printer engine 160 executes printing of the target image. Printing of the facial shape-corrected target image is completed thereby.

In the first embodiment, the present invention is implemented in a modification process for correcting facial shape in a target image. In general, the invention is applicable to instances of overlapping modification areas targeted for modification in addition to facial modification processes described above.

B. Second Embodiment

Figure 14:
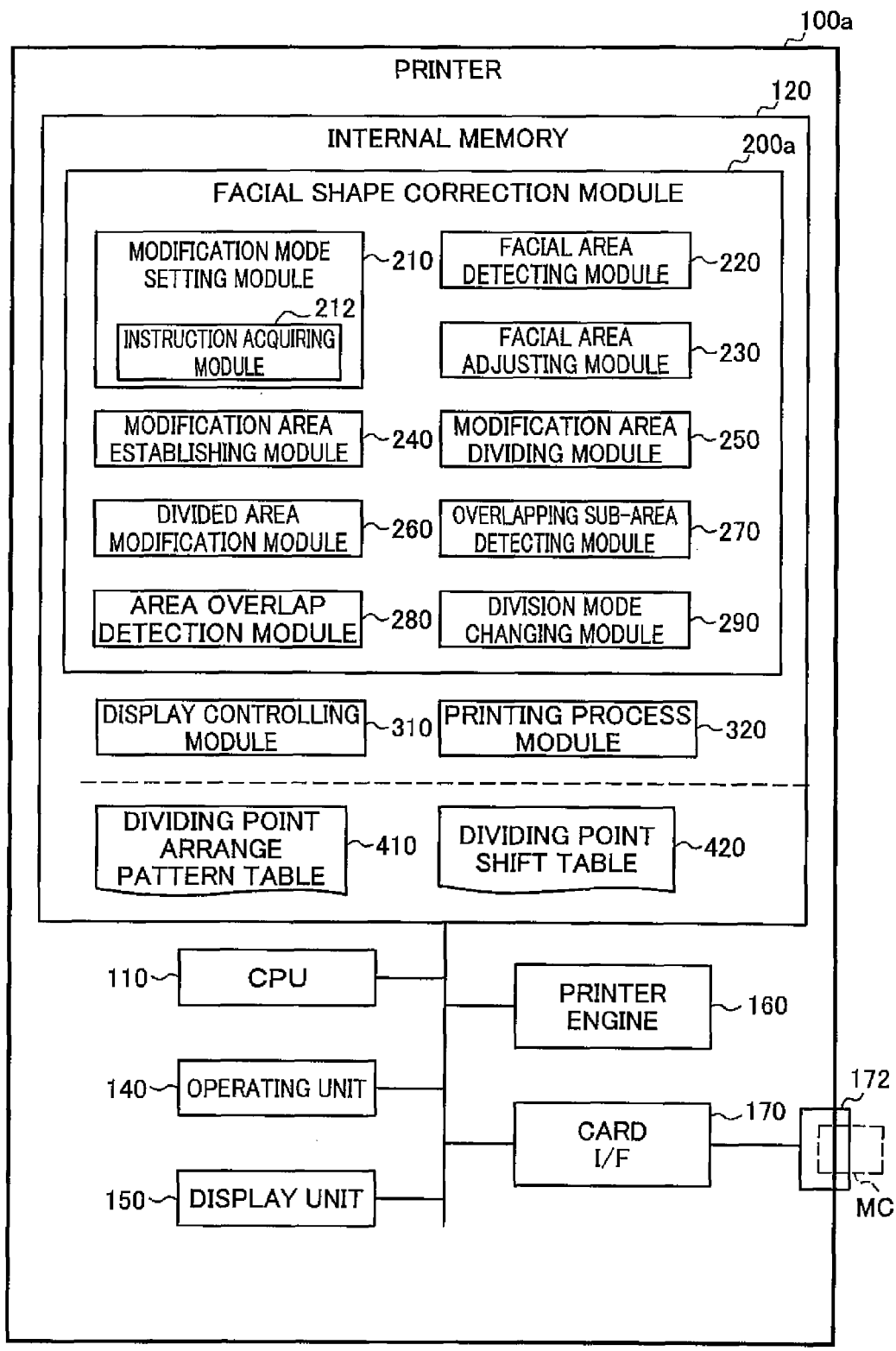
FIG. 14 is an illustration schematically depicting the configuration of a printer in the second embodiment.

FIG. 14 is an illustration schematically depicting the configuration of a printer 100a in the second embodiment. The printer 100a of the second embodiment differs from the printer 100 of the first embodiment shown in FIG. 1 in that the facial shape correction module 200a includes an area overlap detection module 280 and a division mode changing module 290. In other respects, it is similar to the printer 100 of the first embodiment.

Figure 15:
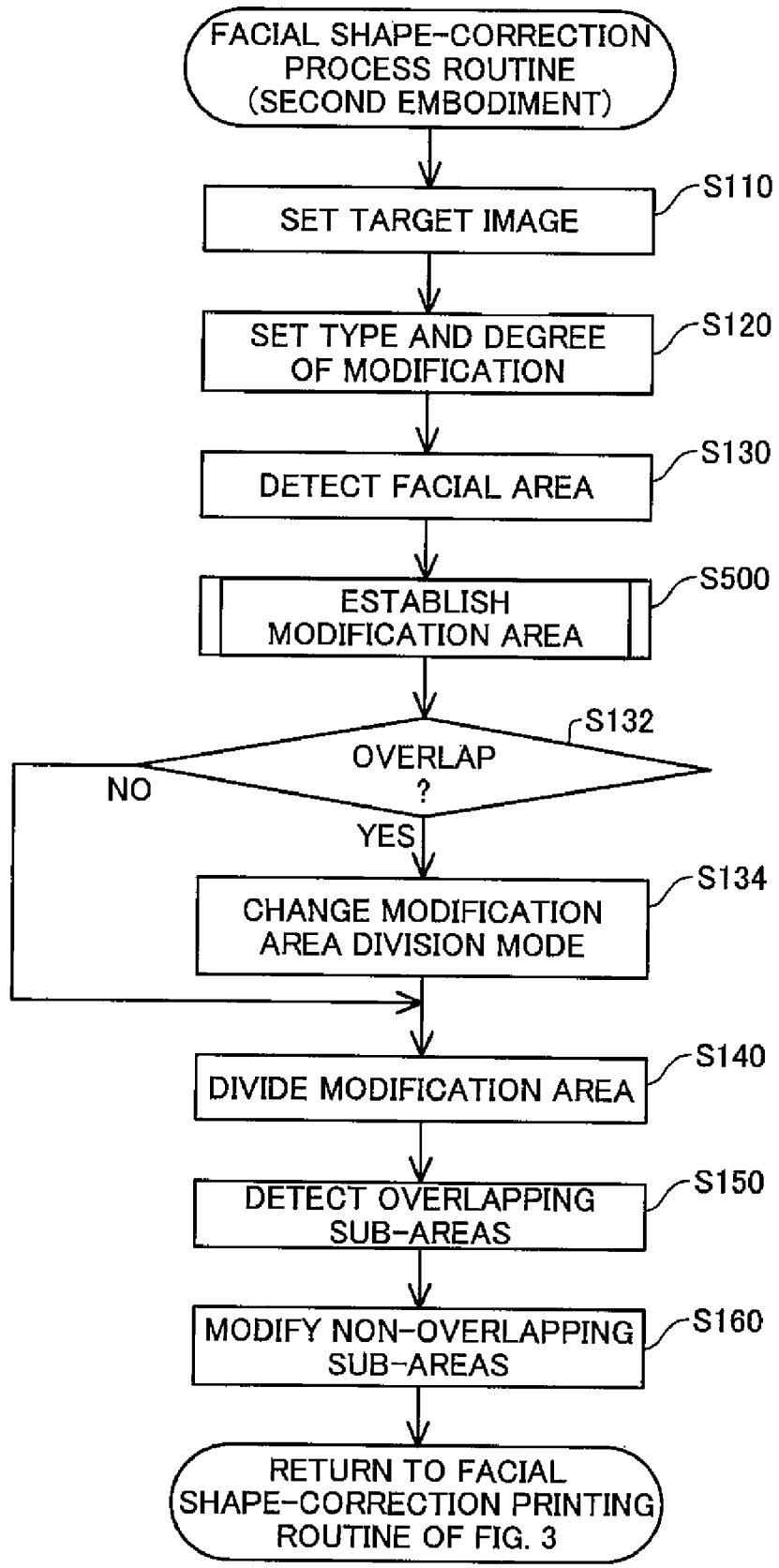
FIG. 15 is a flowchart showing the facial shape correction process routine in the second embodiment.

FIG. 15 is a flowchart showing the facial shape correction process routine in the second embodiment. Similar to the facial shape correction process routine of the first embodiment (FIG. 4), this facial shape correction process routine is executed in Step S100 of the facial shape correction routine (FIG. 3). The facial shape correction process routine of the second embodiment 2 differs from the facial shape correction process routine of the first embodiment shown in FIG. 4 in that there are two additional steps S132, S134 preceding Step S140. In other respects it is similar to the facial shape correction process routine of the first embodiment.

In Step S132, the area overlap detection module 280 detects whether the modification areas established in Step S500 overlap. As with detection of overlapping sub-areas (Step S150), the existence of overlap of modification areas can be determined using various types of algorithms for determining the overlap of planar figures. If as a result of detection it is determined that modification areas overlap, the process advances to Step S134. If on the other hand it is determined that modification areas do not overlap, the process moves to Step S140.

In Step S134, the division mode changing module 290 changes the modification area division mode. Specifically, the division mode changing module 290 changes the modification area division mode used in Step S140 through change of the modification type set in Step S120 (FIG. 15). As will be discussed later, the arrange pattern of the dividing points, which define modification area division modes, are stored in the dividing point arrange pattern table 410 (FIG. 14) in association with corresponding modification types. For this reason, the division mode changing module 290 may change the division mode by either modifying correspondence relationships between modification types and dividing point arrange pattern, or modifying dividing point arrange pattern itself.

Figure 16A:
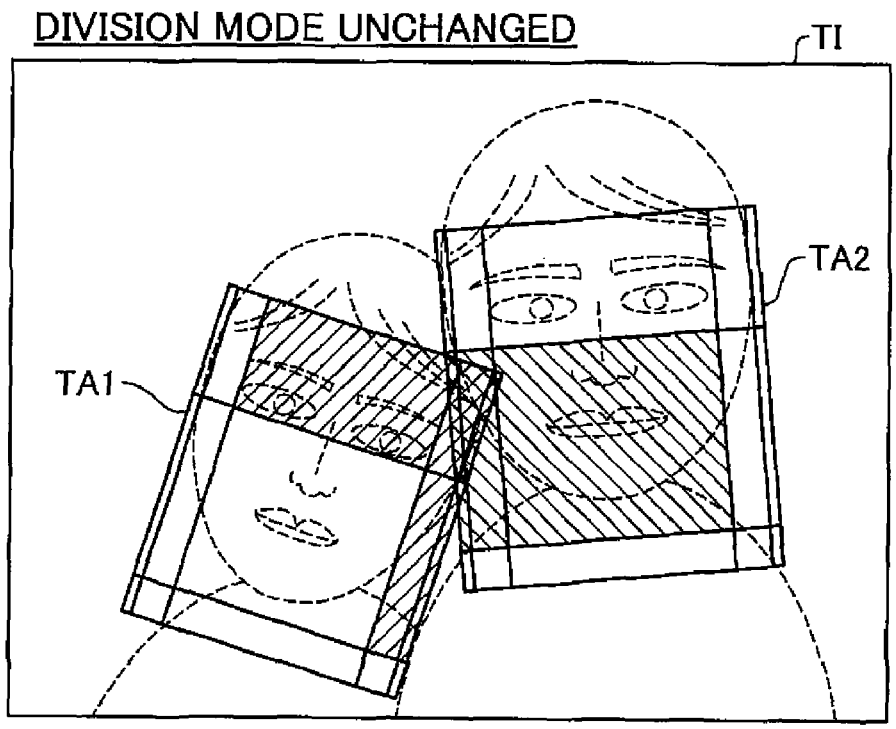
FIGS. 16A and 16B are illustrations depicting the results of division of modification areas in an instance where the division mode is changed.
Figure 16B:
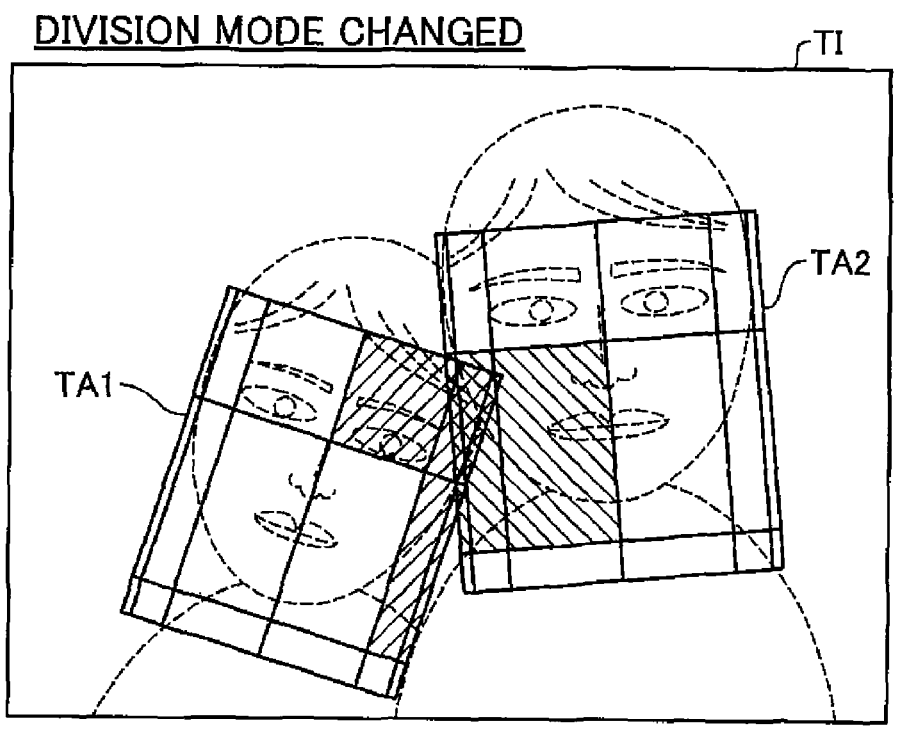

FIGS. 16A and 16B are illustrations depicting the results of division of modification areas in an instance where the division mode is changed. FIG. 16A depicts the results of division of modification areas without changing the division mode, while FIG. 16B depicts the results of division of modification areas where the division mode is changed. Through modification of the division mode, each of the two modification areas TA1, TA2 is divided into 18 sub-areas, which is a greater number than if the division mode is not changed as shown in FIG. 16A. By modifying the division mode and increasing the number of sub-areas in this way, it is possible to reduce the planar dimension of overlapping sub-areas, which are indicated by hatching, in the modification areas TA1, TA2.

Figure 17:
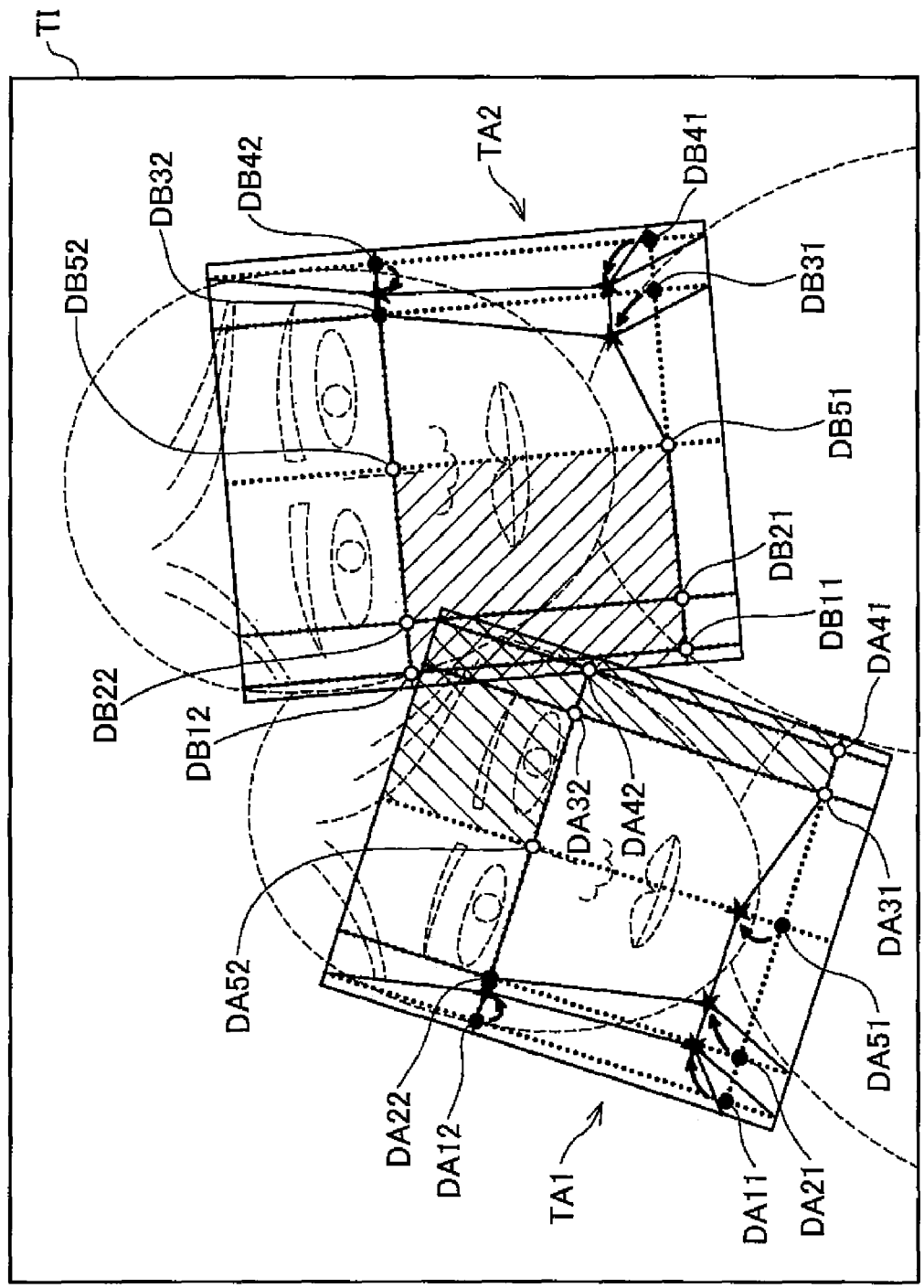
FIG. 17 is an illustration depicting modification of sub-areas of the two modification areas in the second embodiment.

FIG. 17 is an illustration depicting modification of sub-areas of the two modification areas in the second embodiment. FIG. 17 differs from FIG. 9 in that, in each of the two modification areas TA1, TA2, through changing of the division mode there are additional dividing points DA51, DA52, DB51, DB52, the overlapping sub-areas shown by hatching become smaller, and in association with the smaller size of the overlapping sub-areas the dividing points DA22, DB31, DB32 which is not targeted for shifting are now targeted for shifting. Other aspects are similar to FIG. 9. As shown in FIG. 17, the changing of the modification area division mode for subdividing the sub-areas in the modification areas enables reduction of the planar dimension of overlapping sub-areas, which is not modified, in the modification areas.

Figure 18A:
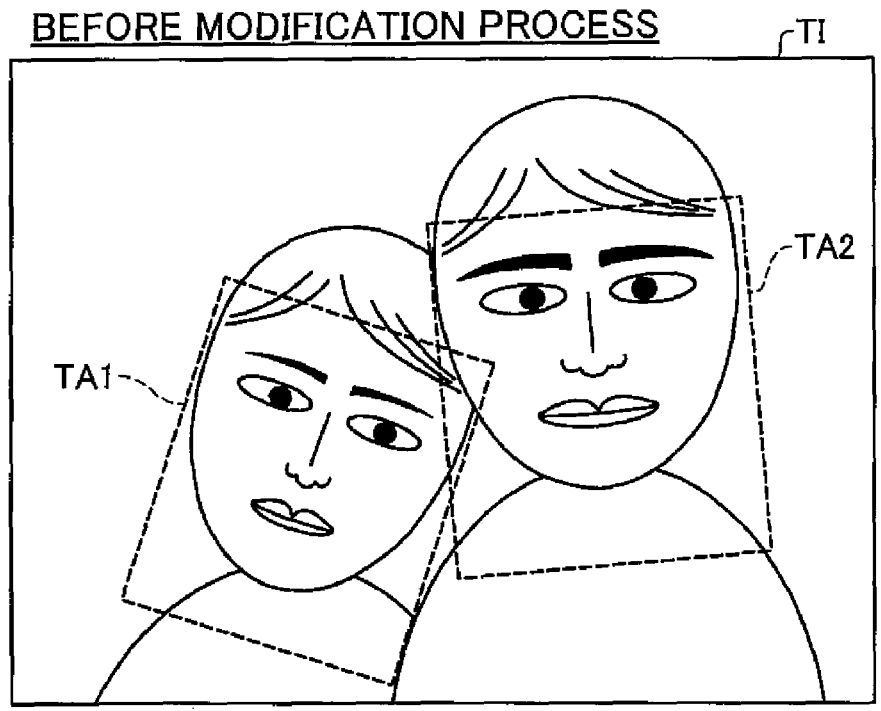
FIGS. 18A and 18B are illustrations showing the results of the modification process carried out in the second embodiment.
Figure 18B:
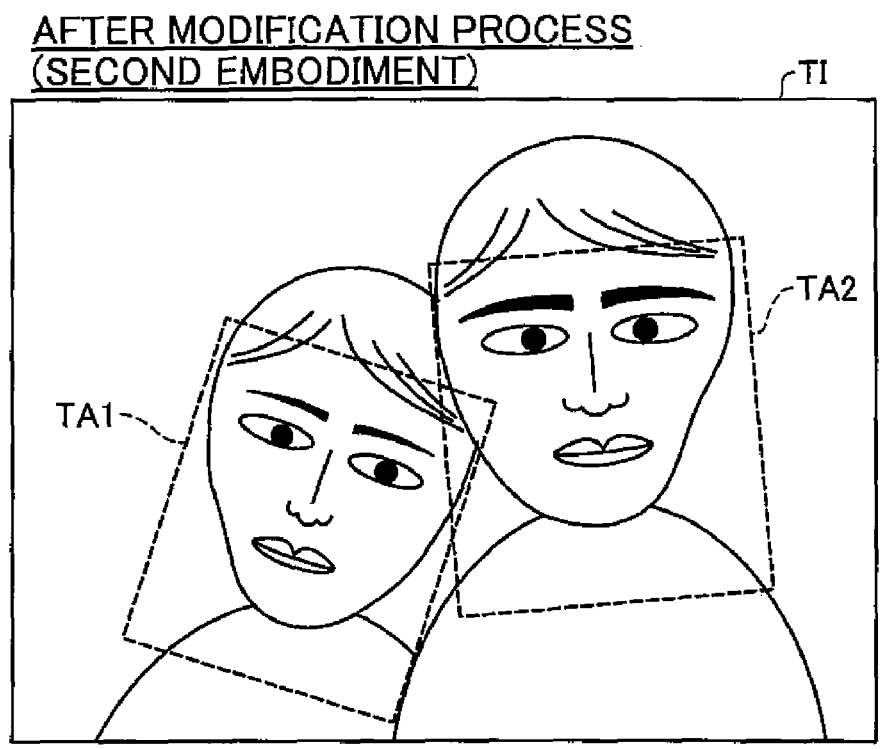

FIGS. 18A and 18B are illustrations showing the results of the modification process carried out in the second embodiment. FIG. 18A shows the target image TI prior to the modification process of Steps S140 through S160 shown in FIG. 15. FIG. 18B shows the target image TI after the modification process. In the second embodiment as well, only non-overlapping sub-areas are modified, while overlapping sub-areas are not modified. Thus, images in the overlapping sections of the modification areas TA1, TA2 are unchanged from the images prior to the modification process (FIG. 18A). As a result, it is possible to prevent appearance of a discontinuous border line BL occurring as a result of modification of overlapping sub-areas. Additionally, since subdivision of the sub-areas within the modification areas reduces the planar dimension of overlapping sub-areas in the modification areas, the face of the person on the right side becomes smaller.

Thus, in the second embodiment, in the case that a plurality of modification areas overlap, the planar dimension of overlapping sub-areas within the modification areas is reduced through subdivision of the sub-areas within the modification areas. For this reason, since the planar dimension of non-overlapping areas for modification within the modification areas expands, the influence caused by not modifying overlapping sub-areas for the modification process results may be reduced. The second embodiment is preferable to the first embodiment in that the influence for the results of the modification process can be reduced in this way. On the other hand, the first embodiment is preferable in that the modification process is simpler than the second embodiment.

In the second embodiment, the overlapping sub-area is established through changing of the division mode for subdividing the sub-area. Thus, the subdivided sub-area is equivalent to the sub-area which is divided from the overlapping sub-areas prior to the changing of the division mode. In general, so long as subdivision of overlapping sub-areas is available, the influence for the results of the modification process may be further reduced. For example, in the case that an overlapping sub-area is detected, the overlapping sub-area may be further divided into two or more sub-areas. It is also acceptable to divide modification areas into sufficiently small sub-areas regardless of whether there is any overlap of modification areas. However, in terms of reducing the processing load associated with the modification process, preferred practice is to subdivide the modification areas in the case that overlap of modification areas is detected, while omitting to subdivide the modification areas in the case that overlap of modification areas is not detected.

C. Establishment of Modification Area

Figure 19:
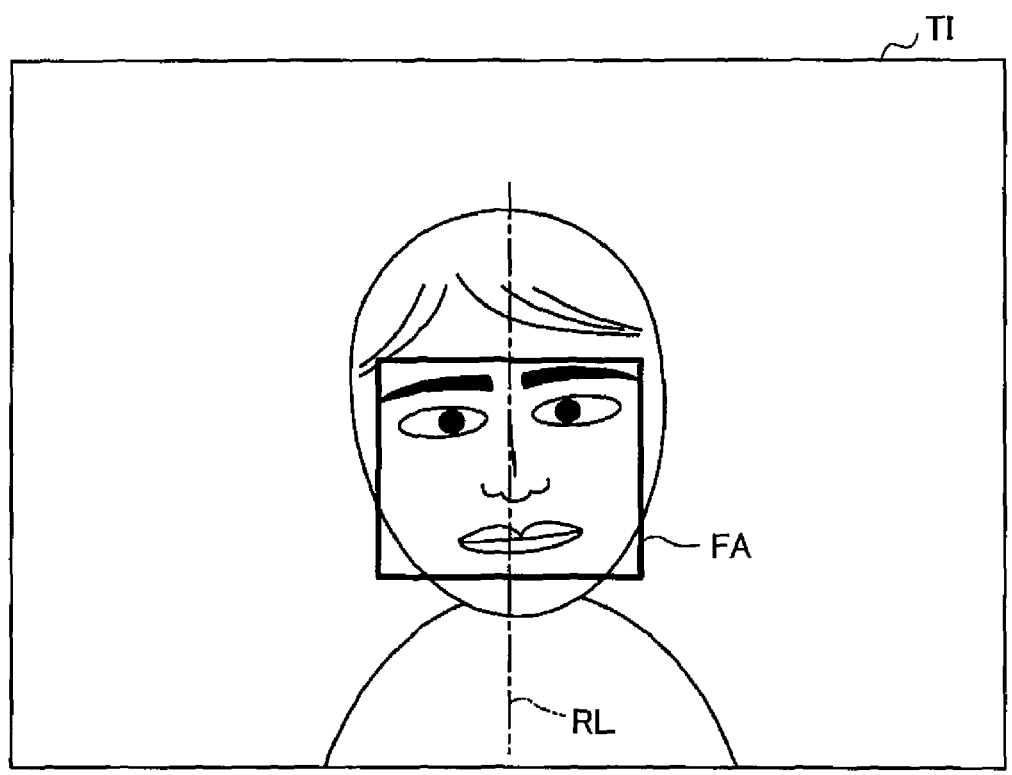
FIG. 19 is an illustration depicting another example of facial area detection results.

FIG. 19 is an illustration depicting another example of facial area FA detection results different from those in FIG. 6. In the following discussion it is assumed that the image TN2 (FIG. 2) containing only a single person is selected from the user interface for image selection. As shown in FIG. 19, in Step S130 of FIG. 4, a single facial area FA is detected from the target image TI. If a plurality of facial areas are detected from the target image TI, the modification area establishing process described below are performed on the individual detected facial areas. A reference line RL shown in FIG. 19 defines the height direction (vertical direction) of the facial area FA, and the line RL also represents the center of the facial area FA in the width direction (right-left direction). That is, the reference line RL is a straight line which passes through the centroid of the rectangular facial area FA and which is parallel to the border lines in the height direction (vertical direction) of the facial area FA.

Figure 20:
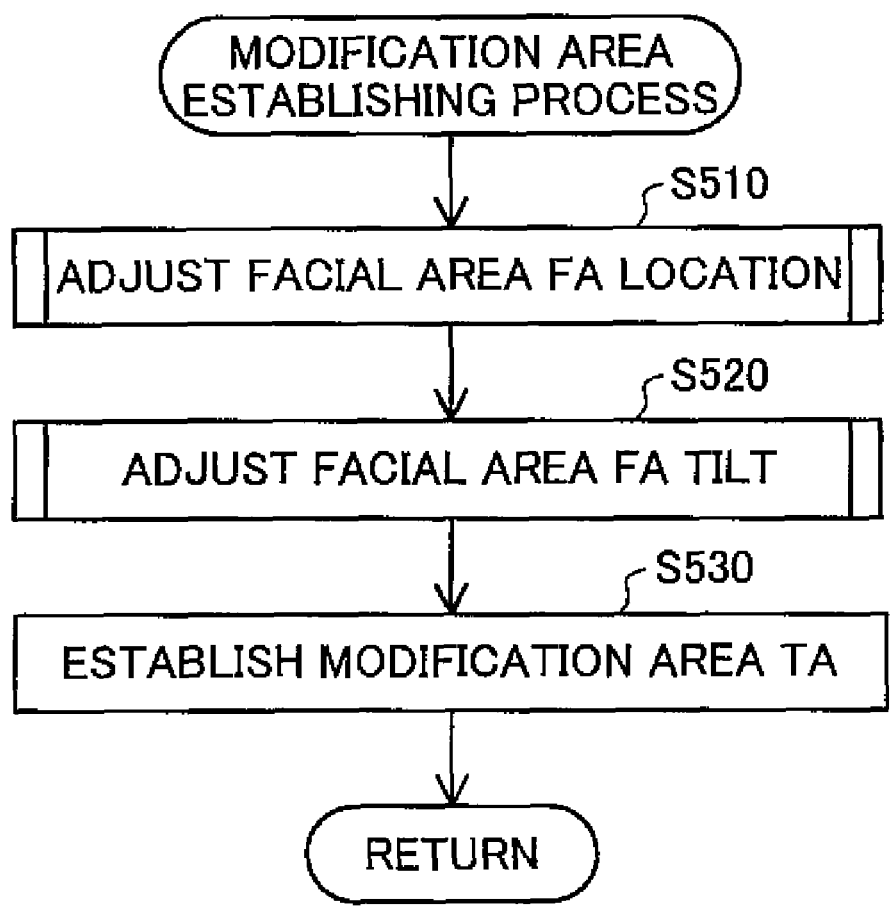
FIG. 20 is a flowchart of the modification area establishing process.

FIG. 20 is a flowchart of the modification area establishing process. The process shown in the flowchart of FIG. 20 is executed in Step S500 of FIG. 4. In Step S510, the facial area adjusting module 230 (FIG. 1) performs location adjustment in the height direction of the facial area FA detected in Step S130 (FIG. 4). Here, location adjustment of the facial area FA in the height direction refers to adjustment of the location of the facial area FA along the reference line RL (see FIG. 19) and resetting the facial area FA in the target image TI.

Figure 21:
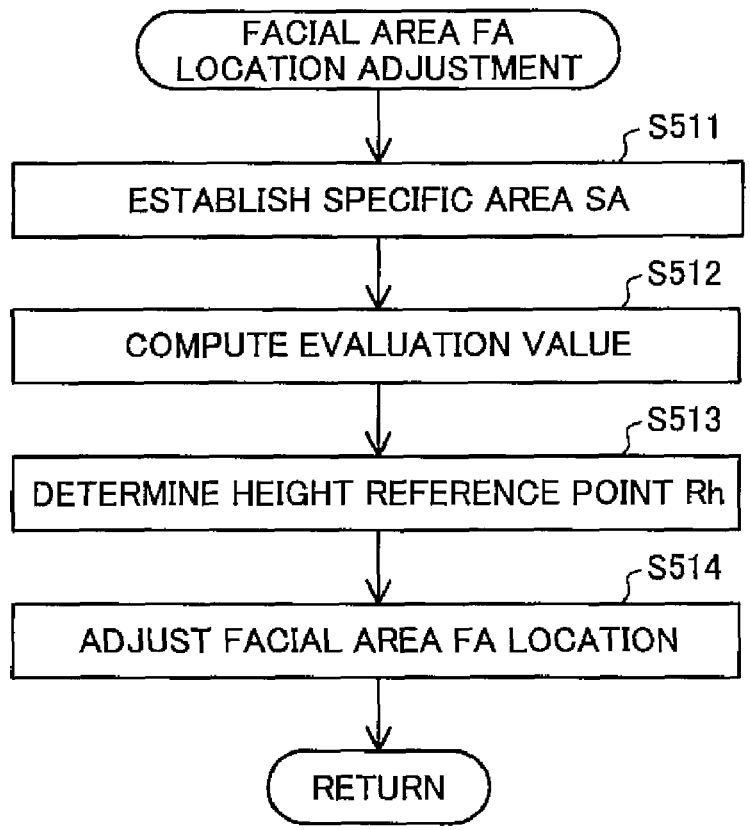
FIG. 21 is a flowchart of the facial area height direction location adjustment process.

FIG. 21 is a flowchart of the facial area FA height direction location adjustment process. In Step S511, the facial area adjusting module 230 (FIG. 1) establishes a specific area SA. Here, a specific area SA refers to an area on the target image TI and which includes an image of a prescribed reference subject referred in the location adjustment process of the facial area FA in the height direction. The reference subject can be set, for example, as the "eyes," in which case the specific area SA would be set to an area which contains images of the "eyes."

Figure 22:
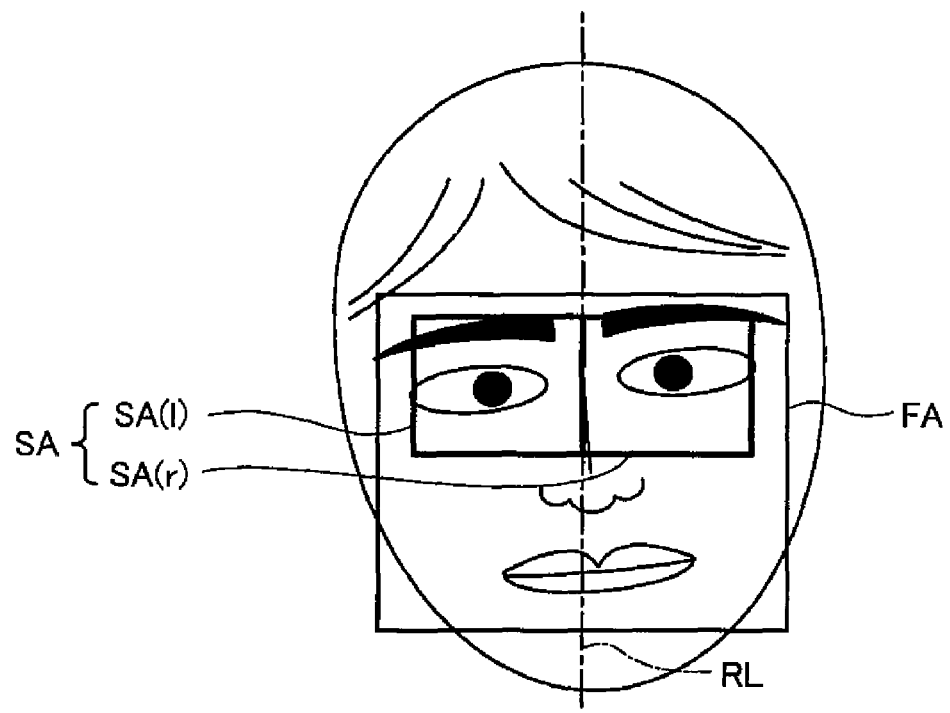
FIG. 22 is an illustration depicting an exemplary specific area.

FIG. 22 is an illustration depicting an exemplary specific area SA. The facial area adjusting module 230 establishes the specific area SA on the basis of a relationship to the facial area FA. Specifically, the specific area SA is defined as an area of size equivalent to the size of the facial area FA reduced (or enlarged) by a prescribed ratio in the direction orthogonal to the reference line RL and the direction parallel to the reference line RL, and having a prescribed positional relationship to the location of the facial area FA. The aforementioned prescribed ratio and prescribed positional relationship is pre-established in such a way that, if the specific area SA is established on the basis of a relationship to the facial area FA detected by the facial area detecting module 220, the specific area SA becomes an area which includes an image of both eyes. In preferred practice the specific area SA may be set as small as possible so long as images of both eyes are included in it, so as to avoid insofar as possible the inclusion of images which may cause misrecognition to the eyes (e.g. an image of the hair).

As shown in FIG. 22, the specific area SA is established as an area of rectangular shape which is symmetrical with respect to the reference line RL. The specific area SA is divided by the reference line RL into an area on the observer's left side (hereinafter also termed the "left divided specific area SA(l)") and an area on the observer's right side (hereinafter also termed the "right divided specific area SA(r)"). The specific area SA is established in such a way that an image of one eye is included respectively in the left divided specific area SA(l) and the right divided specific area SA(r).

Figure 23:
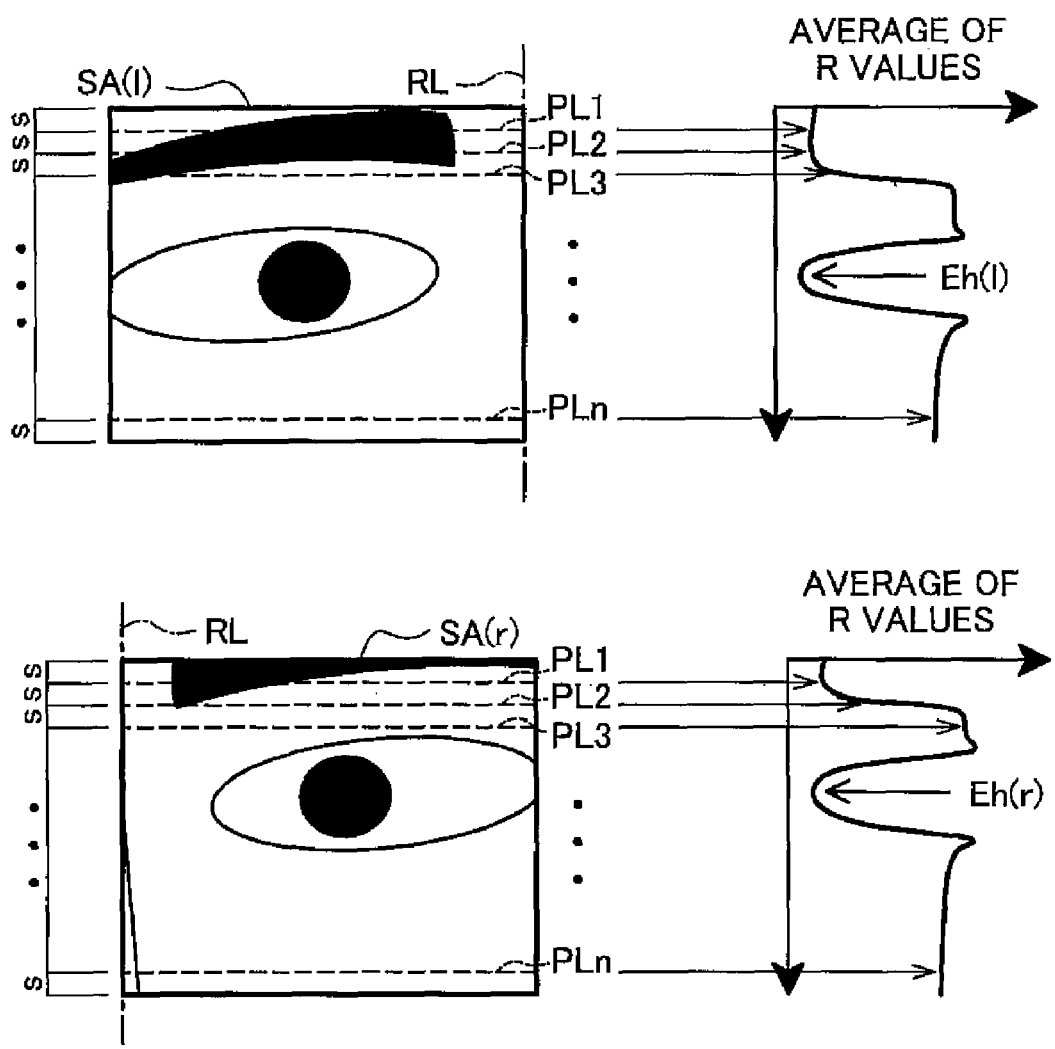
FIG. 23 is an illustration depicting an exemplary method for calculating the evaluation value.

In Step S512 (FIG. 21), the facial area adjusting module 230 (FIG. 1) computes an evaluation value for detecting the locations of the images of the eyes in the specific area SA. FIG. 23 is an illustration depicting an exemplary method for calculating the evaluation value. For calculation of the evaluation value it is preferable to use the R value (R component value) of each pixel of the target image TI which is represented as RGB image data. The reason for using R value is that since R value between areas of skin and the areas of the eyes differs sufficiently, thereupon improvement of accuracy for detecting images of the eyes is expected by using R values to compute the evaluation value. Moreover, since the data of the target image TI is obtained in the form of RGB data, it is also possible to make the evaluation value computation more efficient by using R values to compute the evaluation value. As shown in FIG. 23, computation of evaluation values is carried out separately for the two divided specific areas (the right divided specific area SA(r) and the left divided specific area SA(l)) respectively.

As shown in FIG. 23, the facial area adjusting module 230 establishes a number n of straight lines which are orthogonal to the reference line RL (hereinafter termed "target pixel specification lines PL1 through PLn") within the divided specific areas (the right divided specific area SA(r) and the left divided specific area SA(l)). The target pixel specification lines PL1 through PLn are straight lines which divide the height of each divided specific area (i.e. its size along the reference line RL) into (n+1) equal portions. That is, all of the distances between the neighboring target pixel specification lines are same distance s.

Figure 24A:
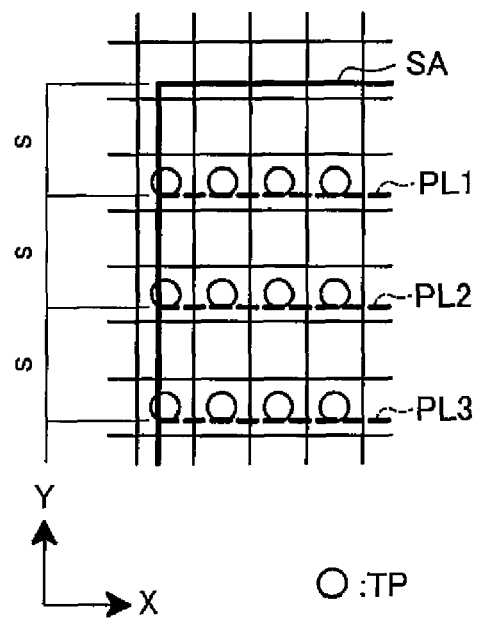
FIGS. 24A and 24B are illustrations showing an exemplary method for evaluation target pixel selection.
Figure 24B:
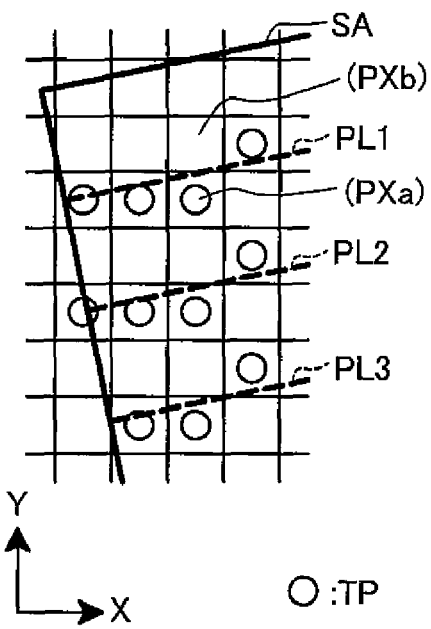

For each of the target pixel specification lines PL1 through PLn, the facial area adjusting module 230 selects pixels to be used in computation of the evaluation value (hereinafter termed "evaluation target pixels TP") from among the pixels which make up the target image TI. FIGS. 24A and 24B are illustrations showing an exemplary method for evaluation target pixel TP selection. From among the pixels which make up the target image TI, the facial area adjusting module 230 selects as the evaluation target pixels TP those pixels which overlap the target pixel specification lines PL. FIG. 24A shows an instance in which the target pixel specification lines PL lie parallel to the row direction of the pixels of the target image TI (the X direction of FIGS. 24A and 24B). In this instance, pixels on pixel rows which overlap the target pixel specification lines PL (pixels represented by ○ symbols in FIG. 24A) are selected as the evaluation target pixels TP for the corresponding target pixel specification lines PL.

On the other hand, depending on the facial area FA detection method and the specific area SA establishment method, there may occur instances in which the target pixel specification lines PL are not parallel to the row direction of the pixels (the X direction) of the target image TI, as shown in FIG. 24B. In such instances as well, as a general rule, pixels which overlap the target pixel specification lines PL are selected as the evaluation target pixels TP for the corresponding target pixel specification lines PL. However, if a given target pixel specification line PL overlaps two pixels which are situated in the same column of the pixel matrix of the target image TI (i.e. which have identical Y coordinates), as with the relationship between the target pixel specification line PL1 and the pixels PXa and PXb in FIG. 24B for example, the pixel with the shorter overlapping section length (e.g. the pixel PXb) is excluded from the evaluation target pixels TP. That is, for each of the target pixel specification lines PL, only a single pixel is selected as the evaluation target pixel TP from one column of the pixel matrix.

If the tilt of the target pixel specification lines PL exceeds 45° with respect to the X direction, the relationship of the columns and rows of the pixel matrix in the preceding description is reversed, so that only a single pixel is selected as the evaluation target pixel TP from one row of the pixel matrix. Moreover, depending on the size relationship between the target image TI and the specific area SA, in some instances a single pixel is selected as the evaluation target pixel TP for multiple target pixel specification lines PL.

For each of the target pixel specification lines PL, the facial area adjusting module 230 computes the average values of the R values of the evaluation target pixels TP as the evaluation value. However, for each target pixel specification line PL, some of the pixels with large R values from among the plurality of selected evaluation target pixels TP are excluded from the evaluation value computations. As a specific example, where a number k of evaluation target pixels TP are selected for a given target pixel specification line PL, the evaluation target pixels TP are divided into a first group composed of 0.75 k pixels having relatively large R values and a second group composed of 0.25 k pixels having relatively small R values, and only pixels belonging to the second group are targeted for computing the average value of the R values as evaluation values. The reason for excluding some evaluation target pixels TP from the evaluation value calculations will be discussed later.

The facial area adjusting module 230 computes evaluation values for each of the target pixel specification lines PL in the above manner. Here, since the target pixel specification lines PL are straight lines which are orthogonal to the reference line RL, the evaluation values can be expressed as being computed for multiple locations (evaluation locations) along the reference line RL. Evaluation values can also be expressed as values which represent, for each evaluation location, a characteristic distribution of pixel values along the direction orthogonal to the reference line RL.

In Step S513 (FIG. 21), the facial area adjusting module 230 (FIG. 1) detects the locations of the eyes in the specific area SA, and determines a height reference point Rh on the basis of the detected result. First, as shown at right in FIG. 23, for each divided specific area the facial area adjusting module 230 generates a curve representing the evaluation value (average value of R values) distribution along the reference line RL, and detect the location along the reference line RL at which the evaluation value reaches its minimum value as the eye location Eh. The eye location Eh in the left divided specific area SA(l) is denoted as Eh(l), and the eye location Eh in the right divided specific area SA(r) is denoted as Eh(r).

In the case of Asians, it is expected that a section representing an image of the skin in a divided specific area has a large R value, while an area representing an image of the eye (more specifically, the pupil area in the center of the eye) has a small R value. For this reason, it is possible to specify the location along the reference line RL at which the evaluation value (average value of R values) reaches its minimum value as being the eye location Eh, in the manner described above. However, in the case of other racial types (e.g. Caucasian or African), other evaluation values may be used (e.g. luminance, brightness, or B value).

As shown in FIG. 23, in some instances a divided specific area may include another image with a small R value (e.g. an image of the eyebrow or hair) in addition to an image of the eye. For this reason, if the curve representing the distribution of evaluation values along the reference line RL has more than one extremely small value, the facial area adjusting module 230 decides that, of the locations of extremely small values, the location furthest towards the bottom side is the eye location Eh. This decision is possible because, in general, images with small R value such as an eyebrow or hair are mostly situated to the upper side of the image of the eye, while there are few conceivable instances in which an image with small R value is situated to the lower side of the image of the eye.

The curve may have local minimum value despite large evaluation values at the location lower than the image of the eye (primarily at locations corresponding to an image of the skin). So, it is preferable to ignore any local minimum values that are greater than a prescribed threshold value. Alternatively, it is also possible to simply specify as the eye location Eh the location of the target pixel specification line PL which corresponds to the minimum value among the evaluation values which were computed for each target pixel specification line PL.

In this embodiment, the eye (the pupil area in the center of the eye), which is a region considered to have a relatively large color difference from the surrounding area in the face, is used as the smallest subject for adjusting facial area FA location. However, since the average value of R values which is used as the evaluation value is computed by targeting a plurality of evaluation target pixels TP on the target pixel specification lines PL, there is a risk that, for example, the accuracy of detection of the pupil area decreases due to the effects of the image of the white area which surrounds the pupil area. Accordingly, detection accuracy of the reference subject can be improved by excluding some of the evaluation target pixels TP considered to have appreciable color difference from the reference subject (for example, pixels of relatively large R values belonging to the aforementioned first group) from the computations of evaluation values in the manner discussed earlier.

Figure 25:
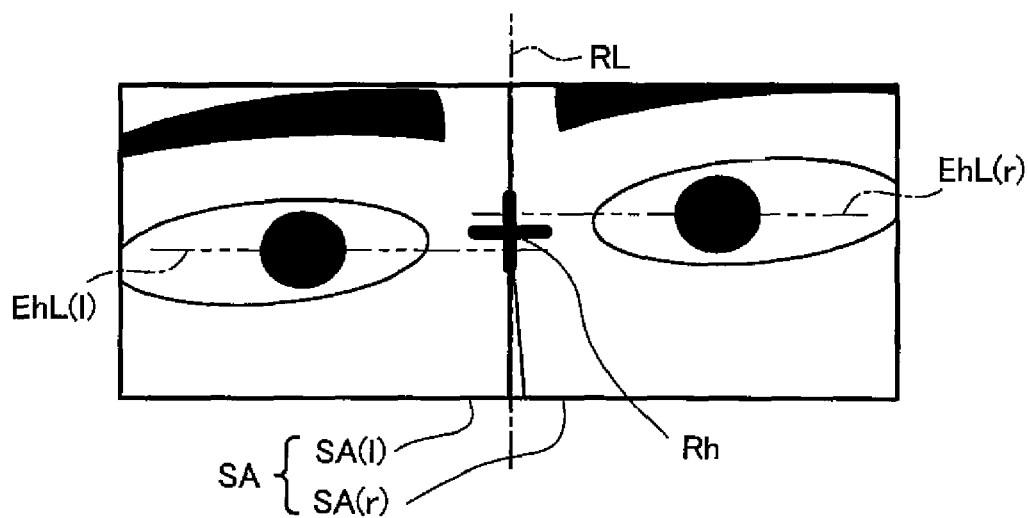
FIG. 25 is an illustration showing an exemplary method for determining height reference point.

Next, the facial area adjusting module 230 determines the height reference point Rh on the basis of the detected eye location Eh. FIG. 25 is an illustration showing an exemplary method for determining height reference point Rh. The height reference point Rh is a point that is used as a reference during location adjustment of the facial area FA in the height direction. As shown in FIG. 25, a point on the reference line RL situated between the two left and right eye locations Eh(l) and Eh(r) is set as the height reference point Rh. Specifically, the midpoint between the intersection of the reference line RL with a straight line EhL(l) indicating the left eye location Eh(l), and the intersection of the reference line RL with a straight line EhL(r) indicating the right eye location Eh(r) is set as the height reference point Rh.

Figure 26:
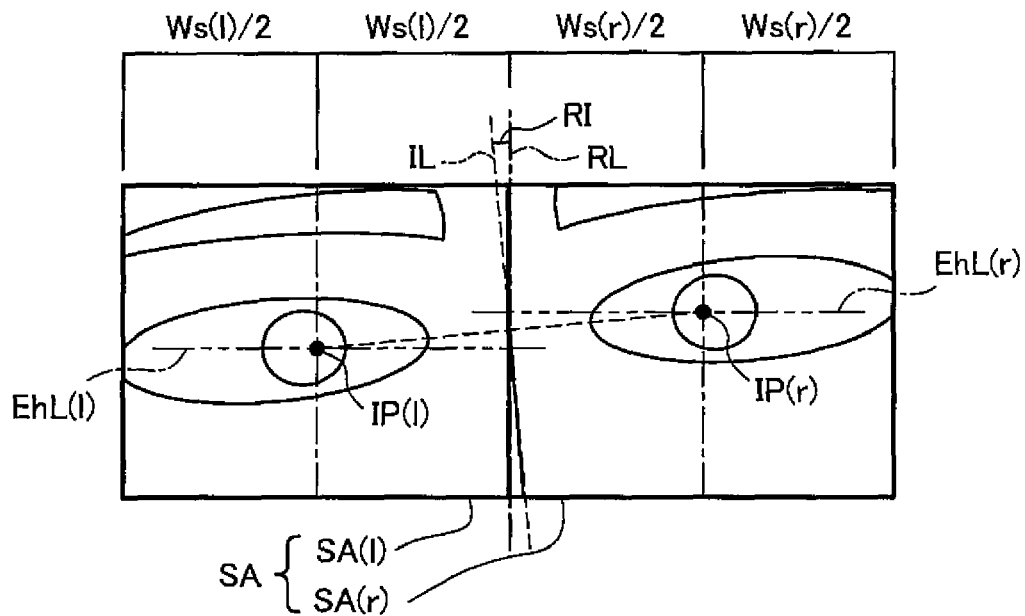
FIG. 26 is an illustration depicting an exemplary method of computing approximate tilt angle.

On the basis of the detected eye locations Eh, the facial area adjusting module 230 also compute an approximate angle of tilt of the facial image (hereinafter termed "approximate tilt angle RI". The approximate tilt angle RI of a facial image is the approximate angle at which the image of a face in the target image TI is estimated to incline with respect to the reference line RL of the facial area FA. FIG. 26 is an illustration depicting an exemplary method of computing approximate tilt angle RI. As shown in FIG. 26, first, the facial area adjusting module 230 determines an intersection point IP(l) of the straight line EhL(l) with a straight line which divides in half the width Ws(l) of the left divided specific area SA(l), and an intersection point IP(r) of the straight line EhL(r) with a straight line which divides in half the width Ws(r) of the right divided specific area SA(r). Then, the angle formed by the reference line RL and a straight line IL which bisects at a right angle a line connecting the intersection point IP(l) to the intersection point IP(r) is computed as the approximate tilt angle RI.

Figure 27:
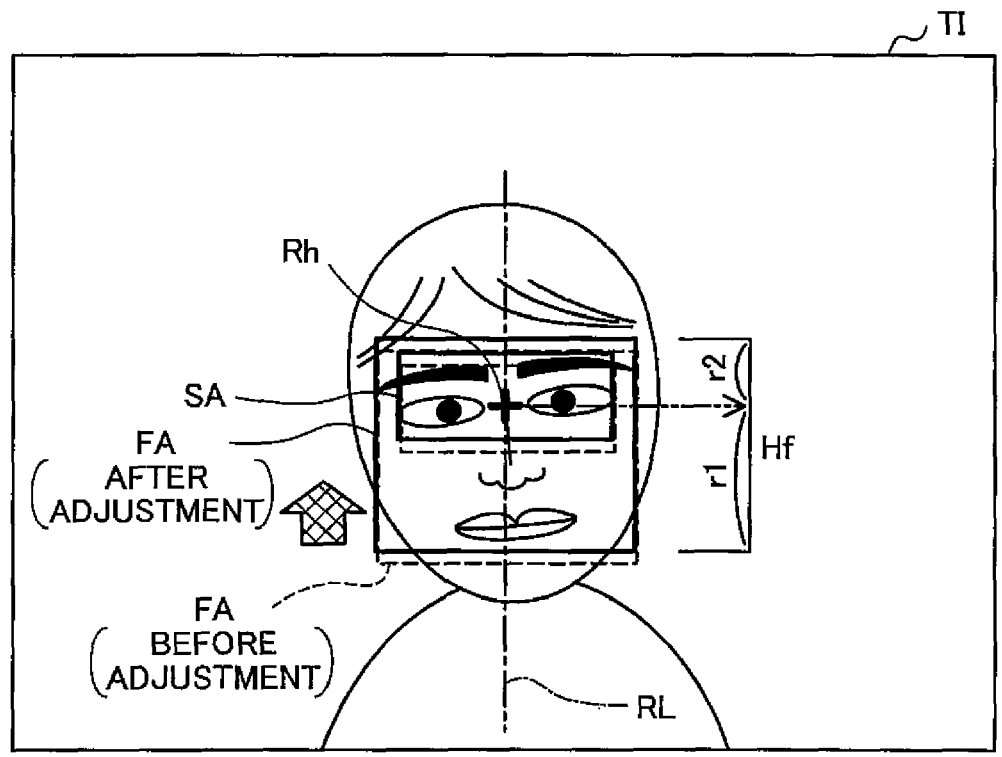
FIG. 27 is an illustration depicting an exemplary method of location adjustment of the facial area in the height direction.

In Step S514 (FIG. 21), the facial area adjusting module 230 (FIG. 1) performs location adjustment of the facial area FA in the height direction. FIG. 27 is an illustration depicting an exemplary method of location adjustment of the facial area FA in the height direction. Location adjustment of the facial area FA in the height direction is accomplished by resetting the facial area FA in such a way that the height reference point Rh is positioned at a prescribed location in the position-adjusted facial area FA. Specifically, as shown in FIG. 27, location adjustment of the facial area FA up or down along the reference line RL is performed so that the height reference point Rh is positioned at a location dividing the height Hf of the facial area FA by a prescribed ratio r1:r2. In the example of FIG. 27, the adjusted facial area FA, shown by the solid lines, is reset through upward shifting of the facial area FA prior to adjustment, shown by the broken lines.

Subsequent to location adjustment of the facial area FA, the facial area adjusting module 230 (FIG. 1) carries out tilt adjustment (angle adjustment) of the facial area FA in Step S520 (FIG. 20). Here, tilt adjustment of the facial area FA refers to resetting the facial area FA by adjusting the tilt of the facial area FA in the target image TI so that the tilt conforms with that of the image of the face. The reference subject, which is referred during executing of tilt adjustment of the facial area FA, is set to "both eyes" for example. During tilt adjustment of the facial area FA, a plurality of evaluation directions representing adjustment angle choices for the tilt adjustment process are established, and evaluation specific areas ESA which correspond to these evaluation directions are established by way of areas that include images of both eyes. Then, for each evaluation direction, an evaluation value is computed on the basis of pixel values of the image of the evaluation specific area ESA, and the tilt of the facial area FA is adjusted using an adjustment angle for tilt adjustment determined on the basis of the evaluation value.

Figure 28:
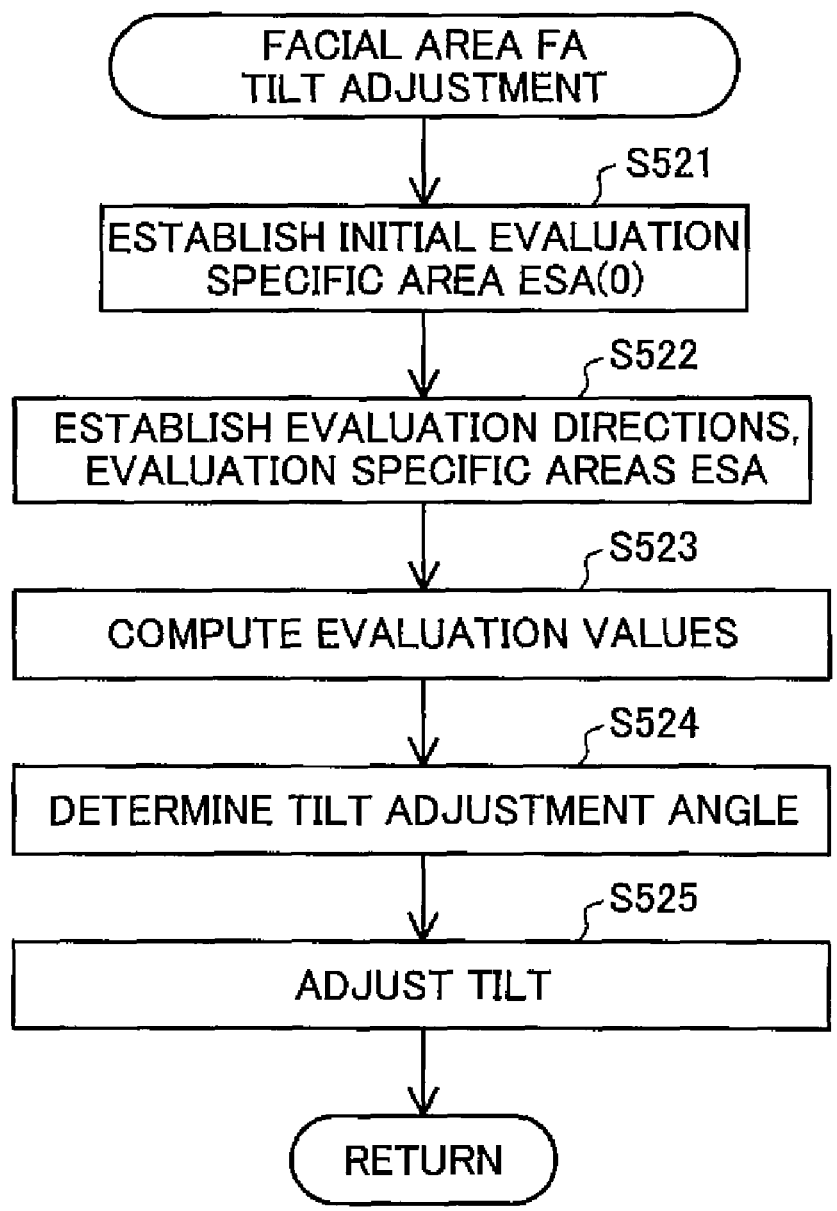
FIG. 28 is a flowchart of the facial area tilt adjustment process.
Figure 29:
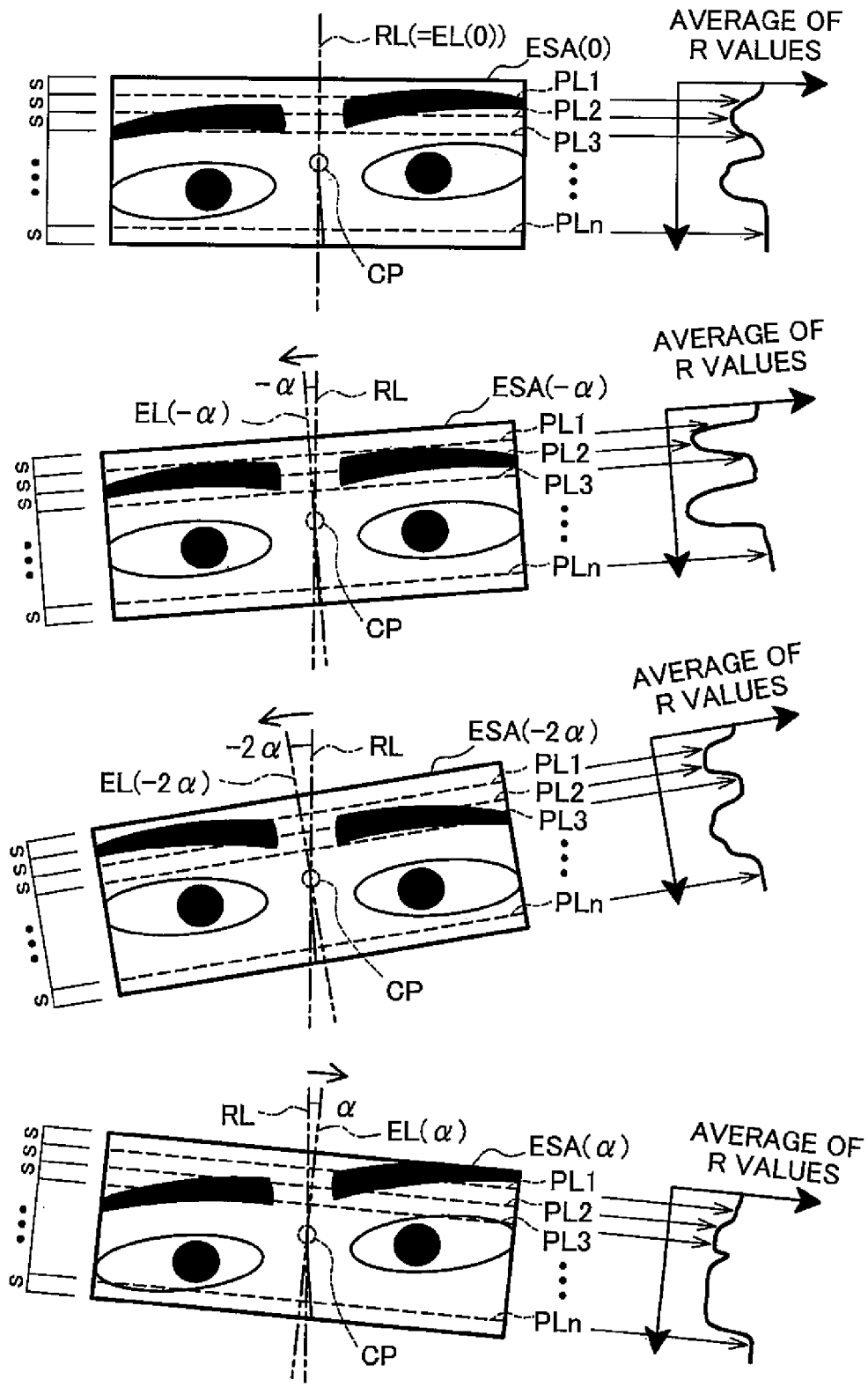
FIG. 29 is an illustration depicting an exemplary method of computing evaluation values for tilt adjustment of the facial area.

FIG. 28 is a flowchart of the facial area FA tilt adjustment process. FIG. 29 is an illustration depicting an exemplary method of computing evaluation values for tilt adjustment of the facial area FA. In Step S521 (FIG. 28), the facial area adjusting module 230 (FIG. 1) establish an initial evaluation specific area ESA(0). The initial evaluation specific area ESA (0) is the evaluation specific area ESA which has been associated with the direction parallel to the reference line RL of the position-adjusted facial area FA (herein also termed the "initial evaluation direction") (see FIG. 27). The specific area SA corresponding to the position-adjusted facial area FA (see FIG. 27) is set with no changes as the initial evaluation specific area ESA(0). The evaluation specific areas ESA used in tilt adjustment of the facial area FA are different from the specific area SA used during location adjustment of the facial area FA in that the former will not be divided into two left and right parts. The established initial evaluation specific area ESA(0) is shown at top in FIG. 29.

In Step S522 (FIG. 28), the facial area adjusting module 230 (FIG. 1) establishes the plurality of evaluation directions and evaluation specific areas ESA which correspond to these evaluation directions. The plurality of evaluation directions are established as adjustment angle choices for the tilt adjustment process. Specifically, a plurality of evaluation direction lines EL which lie within a prescribed range of angles with respect to the reference line RL are established, and directions parallel to the evaluation direction lines EL are established as the evaluation directions. As shown in FIG. 29, straight lines which are defined by rotating the reference line RL clockwise and counterclockwise in prescribed angular increments of α around the center point (centroid) CP of the initial evaluation specific area ESA(0) are established as the plurality of evaluation direction lines EL. An evaluation direction line EL which forms an angle of φ degrees with respect to the reference line RL will be denoted as EL(φ).

The prescribed range for angle of the aforementioned evaluation direction lines EL with respect to the reference line RL is set to ±20 degrees. Herein, when the reference line RL is rotated clockwise the rotation angle is represented as a positive value, and when the reference line RL is rotated counterclockwise the rotation angle is represented as a negative value. The facial area adjusting module 230 rotates the reference line RL in order to establish the plurality of evaluation direction lines EL in the clockwise and counterclockwise directions while increasing the rotation angle to α degrees, 2α degrees, and so on. The reference line RL is rotated within a range not to exceed 20 degrees. FIG. 29 shows evaluation direction lines EL (EL(-α), EL(-2α), EL(α)) which is defined respectively through rotation of the reference line RL by -α degrees, -2α degrees, and α degrees. The reference line RL is also represented as the evaluation direction line EL(O).

The evaluation specific areas ESA which correspond to the evaluation direction lines EL which represent the evaluation directions are areas produced by rotating the initial evaluation specific area ESA(0) about the center point COP, at the angles identical to the rotation angles at which the evaluation direction lines EL have been set. The evaluation specific area ESA which corresponds to the evaluation direction line EL(φ) is denoted as evaluation specific area ESA(φ). FIG. 29 shows evaluation specific areas ESA (ESA(-α), ESA(-2α), ESA (α)) which correspond respectively to the evaluation direction lines EL(-α), EL(-2α), EL(α). The initial evaluation specific area ESA(0) is also treated as one of the evaluation specific areas ESA.

In Step S523 (FIG. 28), the facial area adjusting module 230 (FIG. 1) computes an evaluation value on the basis of the pixel values of the image of the evaluation specific area ESA, for each of the plurality of established evaluation directions. Similar to the evaluation value in the facial area FA location adjustment described earlier, the average value of R values is used as the evaluation value for tilt adjustment of the facial area FA. The facial area adjusting module 230 computes evaluation values for a plurality of evaluation positions lying along the evaluation direction.

The method of computing evaluation values is similar to the method of computing evaluation values in facial area FA location adjustment described earlier. Specifically, as shown in FIG. 29, target pixel specification lines PL1 through PLn orthogonal to the evaluation direction lines EL are established within each of the evaluation specific areas ESA. The evaluation target pixels TP are selected for each of the target pixel specification lines PL1 through PLn. Then the average value of R values of the selected evaluation target pixels TP is computed as the evaluation value.

The method of establishing the target pixel specification lines PL and the method of selecting the evaluation target pixels TP in the evaluation specific areas ESA are similar to the methods employed in facial area FA location adjustment shown in FIGS. 23 and 24, except in that the former do not involve dividing the areas into left and right parts. In the same manner as during facial area FA location adjustment, some of the selected evaluation target pixels TP (e.g. within a number k of evaluation target pixels TP, 0.75 k pixels having relatively large R values) are excluded from evaluation value computations. Distributions of computed evaluation value along the evaluation direction line EL for each evaluation direction are shown at right in FIG. 29.

Since the target pixel specification lines PL are straight lines which lie orthogonal to the evaluation direction lines EL, the evaluation values can be expressed as being computed for multiple locations (evaluation locations) along the evaluation direction line EL. Evaluation values can also be expressed as values which represent, for each evaluation location, a characteristic distribution of pixel values along the direction orthogonal to the evaluation direction line EL.

In Step S524 (FIG. 28), the facial area adjusting module 230 (FIG. 1) determines an adjustment angle to be used in facial area FA tilt adjustment. For each evaluation direction, the facial area adjusting module 230 computes, for the evaluation values computed in Step S523, the dispersion thereof along the evaluation direction line EL, and then selects the evaluation direction associated with the largest dispersion value. The angle formed by the evaluation direction line EL corresponding to the selected evaluation direction with respect to the reference line RL is then determined as the adjustment angle for tilt adjustment.

Figure 30:
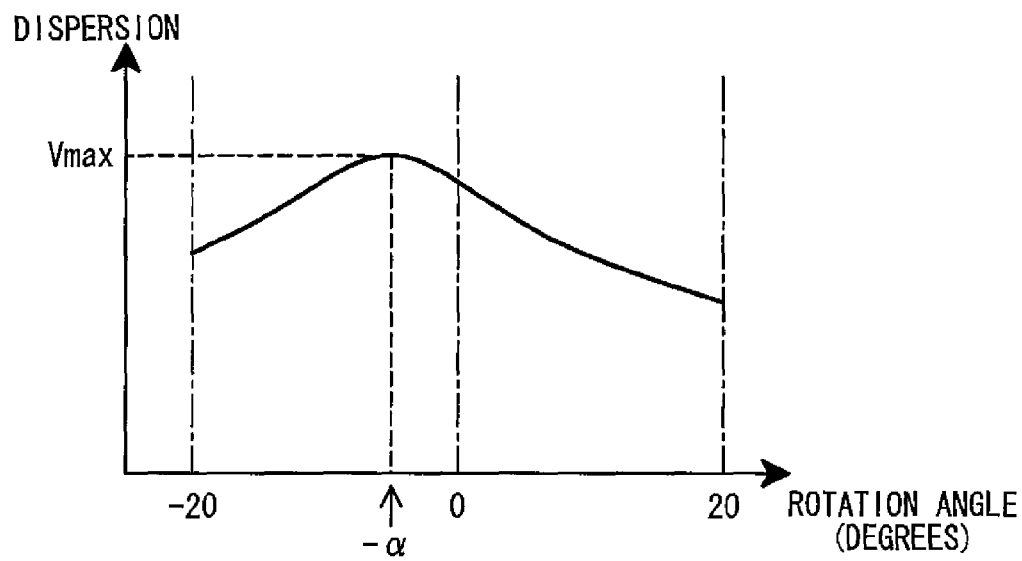
FIG. 30 is an illustration depicting an example of the results of computing evaluation value dispersion for each evaluation direction.

FIG. 30 is an illustration depicting an example of the results of computing evaluation value dispersion for each evaluation direction. In the example of FIG. 30, dispersion reaches its maximum value Vmax in the evaluation direction whose rotation angle is -α degrees. Consequently, a rotation angle of -α degrees, i.e. α degrees in the counterclockwise direction, is determined as the adjustment angle used for the tilt adjustment of the facial area FA.

The reason why the angle which corresponds to the evaluation direction at which the dispersion of evaluation values reaches maximum value is determined as the adjustment angle for use in tilt adjustment will be discussed below. As will be apparent from the second step from the top in FIG. 29, in the evaluation specific area ESA(-α) rotated by a rotation angle of -α degrees, the images of the center portions (pupil portions) of the left and right eyes are aligned in a direction approximately parallel with the target pixel specification lines PL (i.e. orthogonal to the evaluation direction line EL). At this time the images of the left and right eyebrows are similarly aligned in a direction approximately orthogonal to the evaluation direction line EL. Consequently, the evaluation direction which corresponds to the evaluation direction line EL at this time is considered to be the direction representing the approximate tilt of the facial image. At this time, the positional relationship between the images of the eyes and eyebrows (which typically have small R values) on the one hand and the images of the skin (which typically have large R values) on the other will be such that these two have only small sections of overlap in the direction of the target pixel specification lines PL. For this reason, evaluation values at the locations of the images of the eyes and eyebrows are relatively small, while evaluation values at the locations of the images of areas of skin are relatively large. Consequently, as shown in FIG. 29, the distribution of evaluation values along the evaluation direction line LE is one having relatively large deviation (large amplitude), and the value of dispersion becomes large.

On the other hand, as shown in the uppermost step and the third and fourth steps in FIG. 29, in the evaluation specific areas ESA(0), ESA(-2α), and ESA(α) rotated by rotation angles of 0 degrees, -2α degrees, and α degrees, the images of the center portions of the left and right eyes and of the left and right eyebrows are not aligned in a direction orthogonal to the evaluation direction line EL but instead are positioned at offset locations. Consequently, in these instances the evaluation direction corresponding to the evaluation direction line EL does not represent the tilt of the facial image. At this time, the positional relationship between the images of the eyes and eyebrows on the one hand and the images of areas of the skin on the other will be such that these two have large sections of overlap in the direction of the target pixel specification lines PL. For this reason, as shown in FIG. 29, the distribution of evaluation values along the evaluation direction line LE is one having relatively small deviation (small amplitude), and the value of dispersion becomes small.

In this way, if the evaluation direction closely approximates the tilt of the facial image, the value of dispersion of evaluation values along the evaluation direction line EL is larger, whereas if the evaluation direction diverges from the tilt of the facial image, the value of dispersion of evaluation values along the evaluation direction line EL is smaller. Consequently, by determining the angle corresponding to the evaluation direction at which the value of dispersion of evaluation values reaches its maximum value as the adjustment angle for use in tilt adjustment, it is possible to accomplish facial area FA tilt adjustment in such a way as to align the tilt of the facial area FA with the tilt of the facial image.

When the dispersion computation results of evaluation values are such that the maximum value is observed at critical values of angular range, i.e. at −20 degrees or 20 degrees, it is assumed highly likely that tilt of the face has not been evaluated correctly, and therefore facial area FA tilt adjustment is not performed in such instances.

Furthermore, the determined adjustment angle is compared with the approximate tilt angle RI computed during the facial area FA location adjustment process described previously. If the difference between the adjustment angle and the approximate tilt angle RI exceeds a prescribed threshold value, it is assumed that some sort of error has occurred during evaluation or determination in facial area FA location adjustment or tilt adjustment, and therefore facial area FA location adjustment and tilt adjustment is not performed in such instances.

Figure 31:
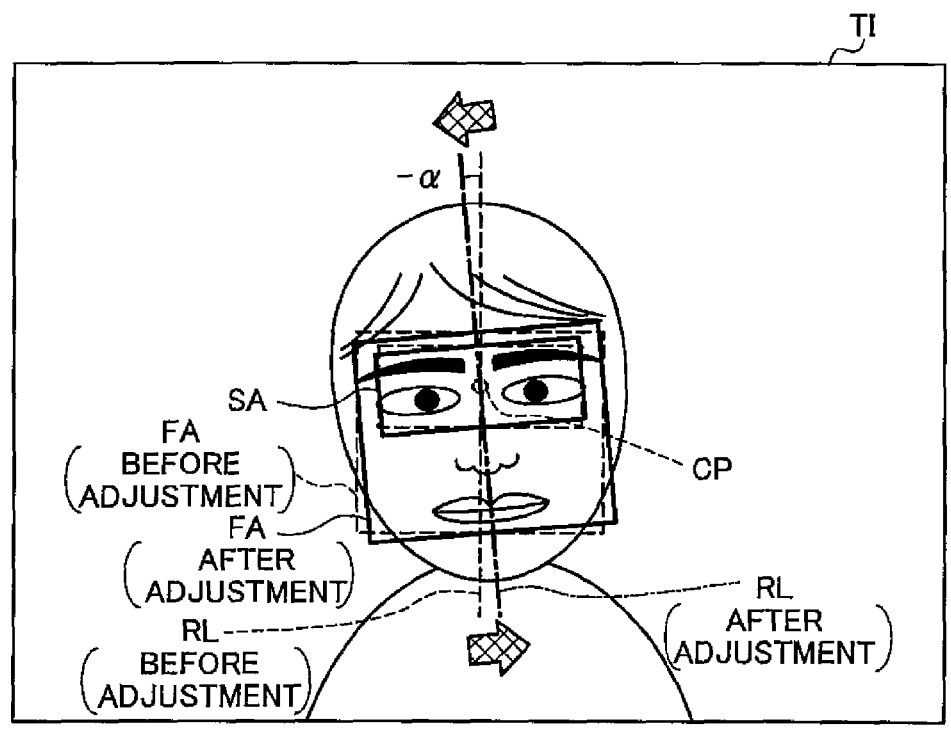
FIG. 31 is an illustration depicting an exemplary facial area tilt adjustment method.

In Step S525 (FIG. 28), the facial area adjusting module 230 (FIG. 1) carries out facial area FA tilt adjustment. FIG. 31 is an illustration depicting an exemplary facial area FA tilt adjustment method. Facial area FA tilt adjustment is carried out by rotating the facial area FA about the center point CP of the initial evaluation specific area ESA(0), by the adjustment angle determined in Step S524. In the example of FIG. 31, the adjusted facial area FA indicated by the solid lines is established through α degree counterclockwise rotation of the facial area FA prior to adjustment, indicated by the broken lines.

Figure 32:
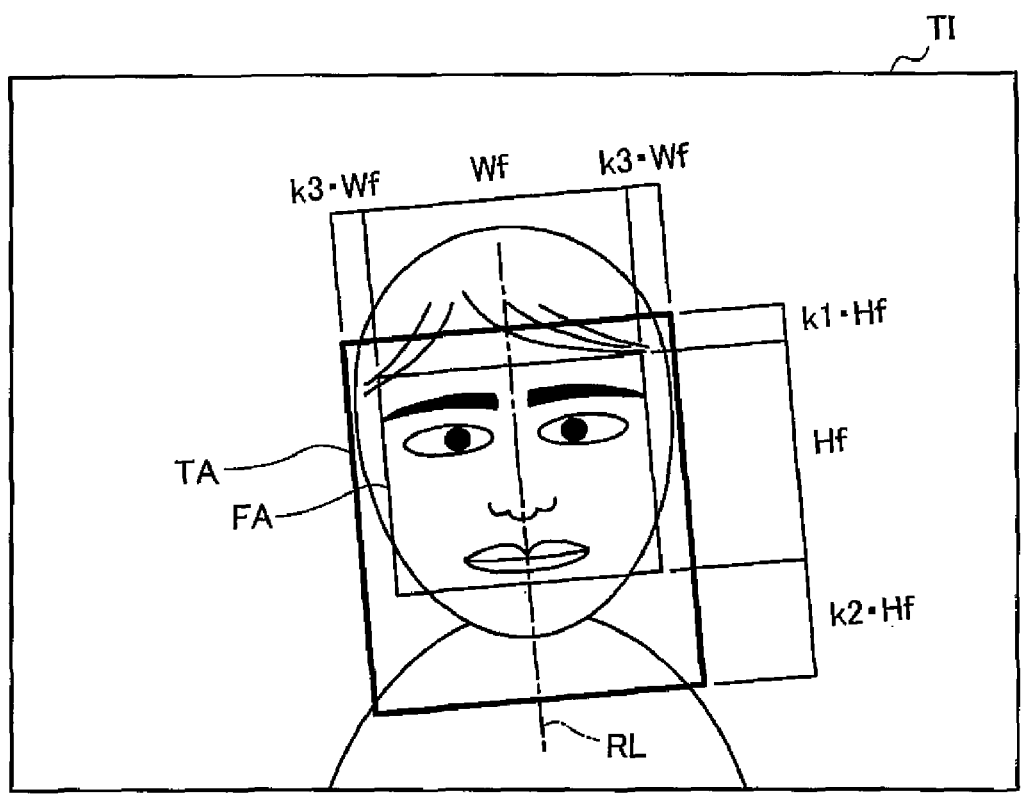
FIG. 32 is an illustration depicting an exemplary method for establishing the modification area.

Upon completion of the facial area FA tilt adjustment process, in Step S530 (FIG. 20), the modification area establishing module 240 (FIG. 1) establishes a modification area TA. The modification area TA is an area on the target image TI and which is targeted for the image modification process for the purpose of facial shape correction. FIG. 32 is an illustration depicting an exemplary method for establishing the modification area TA. As shown in FIG. 32, the modification area TA is established as an area equivalent to expansion (or reduction) of the facial area FA in the direction parallel to the reference line RL of the facial area FA (the height direction) and the direction orthogonal to the reference line RL (the width direction). Specifically, where the size of the facial area FA in the height direction is designated as Hf and its size in the width direction as Wf, the modification area TA is an area equivalent to stretching the facial area FA by k1·Hf in the upward direction and by k2·Hf in the downward direction, and by k3·Wf in the left and right directions respectively. k1, k2, and k3 are prescribed coefficients.

Once the modification area TA is established in this way, the reference line RL, which is parallel to the border lines of the facial area FA in the height direction, forms a straight line which is parallel to the border lines of the modification area TA in the height direction as well. Additionally, the reference line RL will form a straight line which divides the width of the modification area TA in half.

As shown in FIG. 32, the modification area TA will be established as an area that, in relation to the height direction, includes an image extending approximately from the chin to the forehead, and in relation to the width direction, includes images of the left and right cheeks. That is, the coefficients k1, k2, and k3 mentioned above are preset on the basis of the relationship with the size of the facial area FA, in such a way that the modification area TA includes such a range of images roughly.

Figure 33:
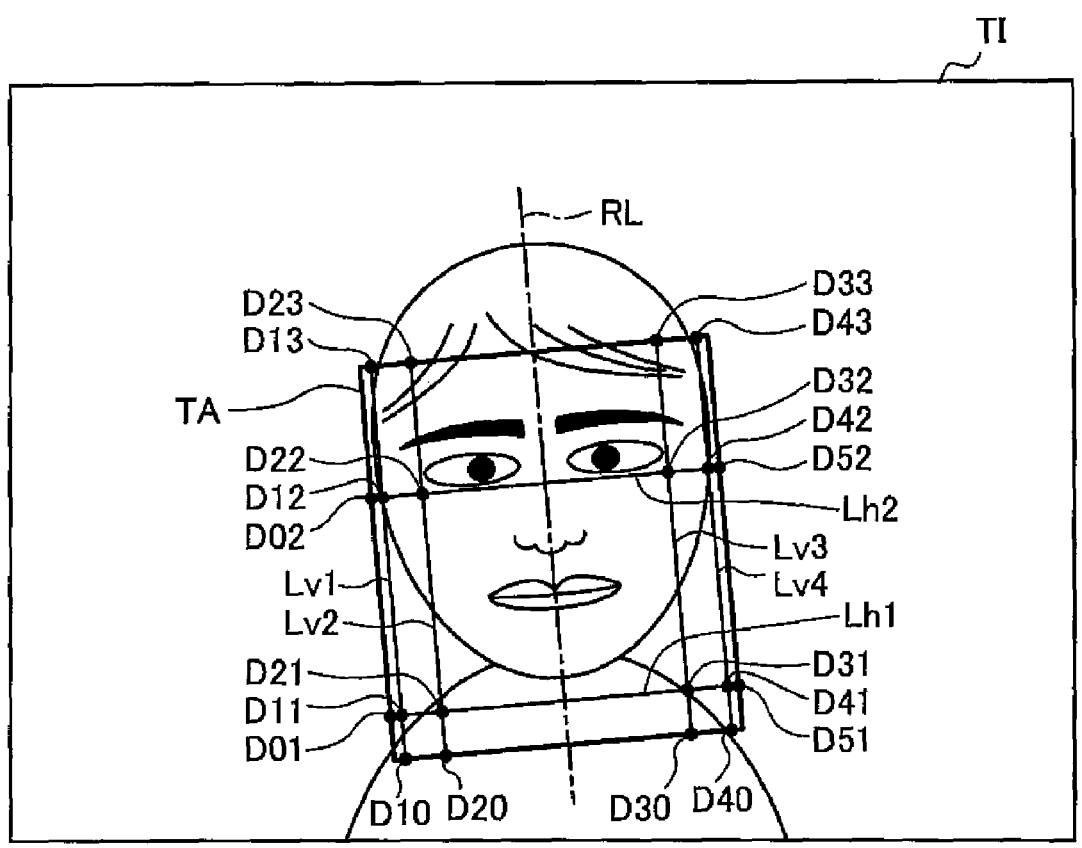
FIG. 33 is an illustration depicting an exemplary method of dividing a modification area into sub-areas.

D. Dividing Point Arrange Pattern:

FIG. 33 is an illustration depicting an exemplary method of dividing a modification area TA into sub-areas. The modification area dividing module 250 arranges a plurality of dividing points D in the modification area TA, and divides the modification area TA into a plurality of sub-areas using straight lines which connect the dividing points D.

The arrange pattern of the dividing points D (the number and locations of the dividing points D) is defined by the dividing point arrange pattern table 410 (FIG. 1) in association with the modification type selected in Step S120 (FIG. 4). The modification area dividing module 250 looks up the dividing point arrange pattern table 410 and arranges the dividing points D according to the mode associated with the modification type selected in Step S120. Where as mentioned previously the modification type has been set to the "TYPE A" modification type (FIG. 5) for sharpening facial contours, the dividing points D are positioned in the pattern associated with this modification type.

As shown in FIG. 33, the dividing points D are positioned at intersections Lv of horizontal dividing lines Lh with vertical dividing lines Lv, and at intersections of the horizontal dividing lines Lh and the vertical dividing lines Lv with the border of the modification area TA. Here, the horizontal dividing lines Lh and the vertical dividing lines Lv are lines serving as reference for placement of the dividing points within the modification area TA. As shown in FIG. 33, two horizontal dividing lines Lh which bisect the reference line RL perpendicularly, and four vertical dividing lines Lv which are parallel to the reference line RL, are established during positioning of the dividing points D in association with the modification type for sharpening facial shape. The two horizontal dividing lines Lh are labeled Lh1 and Lh2 in order from the bottom of the modification area TA. The four vertical dividing lines Lv are labeled Lv1, Lv2, Lv3, and Lv4 in order from the left of the modification area TA.

Within the modification area TA, the horizontal dividing line Lh1 is positioned below the image of the chin, while the horizontal dividing line Lh2 is positioned just below the image of the eyes. The vertical dividing lines Lv1 and Lv4 are positioned to the outside of the images of the cheek lines, while the vertical dividing lines Lv2 and Lv3 are positioned to the outside of the images of the corners of the eyes. Arrangement of the horizontal dividing lines Lh and the vertical dividing lines Lv is executed in accordance with preestablished correspondence relationships with the size of the modification area TA such that the positional relationships of the horizontal dividing lines Lh and the vertical dividing lines Lv to the images ultimately assume the positional relationships given above.

In accordance with the arrangement of the horizontal dividing lines Lh and the vertical dividing lines Lv described above, the dividing points D are positioned at intersections of the horizontal dividing lines Lh with the vertical dividing lines Lv, and at intersections of the horizontal dividing lines Lh and the vertical dividing lines Lv with the border of the modification area TA. As shown in FIG. 33, the dividing points D positioned on a horizontal dividing line Lhi (where i=1 or 2) are labeled D0i, D1i, D2i, D3i, D4i, and D5i in order from the left respectively. For example, the dividing points D positioned on the horizontal dividing line Lh1 are labeled D01, D11, D21, D31, D41, and D51 respectively. Similarly, the dividing points D positioned on a vertical dividing line Lvj (where j=either 1, 2, 3 or 4) are labeled Dj0, Dj1, Dj2, and Dj3 in order from the bottom respectively. For example, the dividing points D positioned on the vertical dividing line Lv1 would be labeled D10, D11, D12, and D13 respectively.

Moreover, as shown in FIG. 33, the arrangement of the dividing points D in the present embodiment is symmetrical with respect to the reference line RL.

The modification area dividing module 250 divides the modification area TA into a plurality of sub-areas with straight lines connecting the positioned dividing points D (i.e. the horizontal dividing lines Lh and the vertical dividing lines Lv). In the example shown in FIG. 15, the modification area TA is divided into 15 sub-areas of rectangular shape.

The arrangement of the dividing points D is defined by the number and locations of the horizontal dividing lines Lh and the vertical dividing lines Lv. For this reason, it is possible to say that the dividing point arrange pattern table 410 defines the number and locations of the horizontal dividing lines Lh and the vertical dividing lines Lv.

E. Modification of Sub-areas:

The individual sub-areas into which the modification area TA is divided through arrangement of the dividing points D within the modification area TA undergoes modification by the divided area modification module 260, through shifting of the position of the dividing points D arranged within the modification area TA.

The mode of shift (the direction of shift and distance of shift) of the dividing point D positions for the modification process is predetermined by the dividing point shift table 420 (FIG. 1), in association with the particular combination of modification type and level of modification set in Step S120 (FIG. 4). The divided area modification module 260 looks up the dividing point shift table 420, and shift the positions of the dividing points D in the direction of shift and by the distance of shift associated with the particular combination of modification type and level of modification set in Step S120.

Where the "TYPE A" modification type for sharpening facial shape is set as the modification type (see FIG. 5), and the "Medium" extent is set as the degree of modification in the manner mentioned previously, the positions of the dividing points D are shifted in the direction of shift and by the distance of shift associated with this combination of modification type and level of modification.

Figures 34, 35:
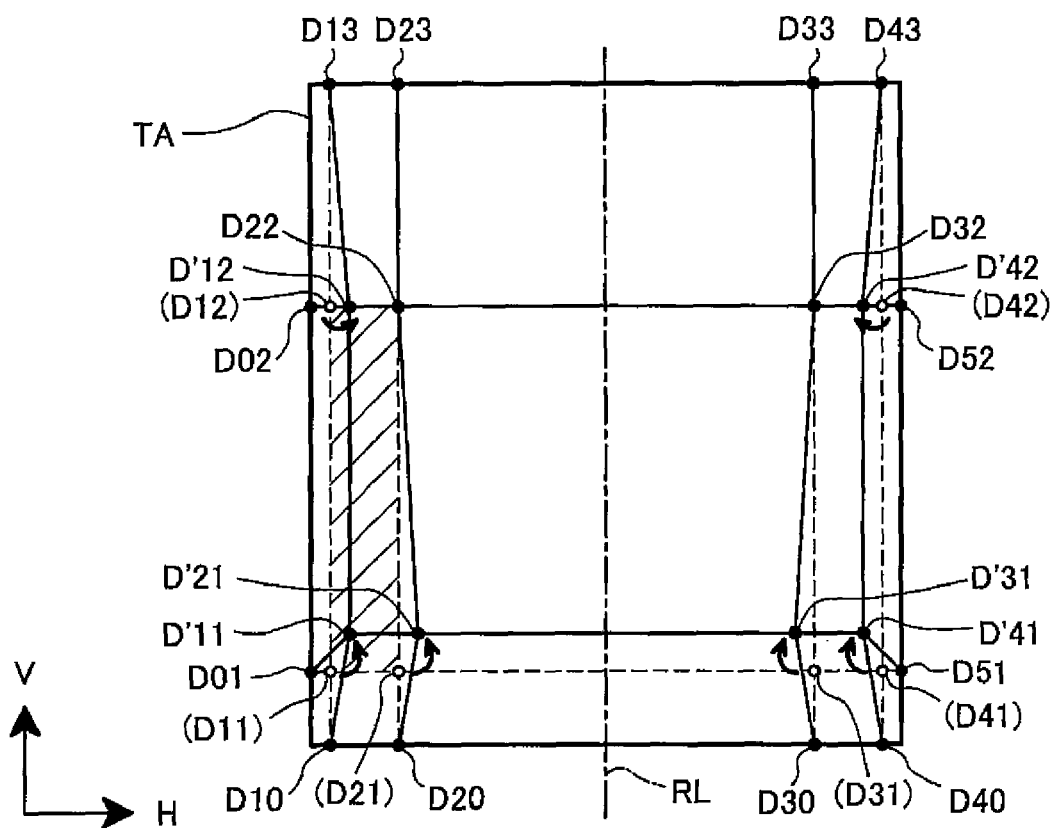
FIG. 34 is an illustration depicting an example of the content of the dividing point shift table.
FIG. 35 is an illustration depicting an example of shifting positions of the dividing points in accordance with the dividing point shift table.

FIG. 34 is an illustration depicting an example of the content of the dividing point shift table 420. FIG. 35 is an illustration depicting an example of shifting positions of the dividing points D in accordance with the dividing point shift table 420. FIG. 34 depicts a shift mode which, of the dividing point D location shift modes defined by the dividing point shift table 420, is the mode associated with the combination of the modification type for sharpening facial shape with the "Medium" extent of modification. As shown in FIG. 34, for each of the dividing points D, the dividing point shift table 420 gives an amount of shift in the direction orthogonal to the reference line RL (the H direction) and the direction parallel to the reference line RL (the V direction). The unit for the amounts of shift given in the dividing point shift table 420 is the pixel pitch PP of the target image TI. For the H direction, shift towards the right side is represented by positive values, while shift towards the left side is represented by negative values. For the V direction, upward shift is represented by positive values, while downward shift is represented by negative values. For example, the dividing point D11 shifts to the right in the H direction by a distance equal to seven times the pixel pitch PP, and upward in the V direction by a distance equal to 14 times the pixel pitch PP. Meanwhile, the dividing point D22 does not shift in both the H direction and V direction, for example.

In order to avoid unnatural-looking boundaries between images inside and outside the modification area TA, the positions of dividing points D which are situated on the borders of the modification area TA (e.g. the dividing points D10 etc. shown in FIG. 35) are not shifted. Consequently, the dividing point shift table 420 shown in FIG. 34 does not define shift modes for dividing points D which are situated on the borders of the modification area TA.

In FIG. 35, the dividing points D prior to being shifted are represented by white circles, while the shifted dividing points D and non-shifted dividing points D are represented by black circles. The shifted dividing points D are denoted as shifted dividing points D'. For example, the position of the dividing point D11 shifts upward to the right in FIG. 35 to become dividing point D'11.

Shift modes are defined in such a way that all combinations of two dividing points D disposed in symmetrical positional relationships with respect to the reference line RL (e.g. the combination of the dividing points D11 and D41) are maintained in their symmetrical positional relationship with respect to the reference line RL even after the dividing points D have been shifted.

For each sub-area making up the modification area TA, the divided area modification module 260 carries out the image modification process in such a way that the image of the sub-area in the condition prior to shifting of the dividing points D is modified to an image of a sub-area newly defined through position shift of the dividing points D. For example, in FIG. 35, the image of the sub-area having the dividing points D11, D21, D22, and D12 as its apices (the sub-area indicated by hatching) is modified into the image of the sub-area having the dividing points D'11, D'21, D'22, and D'12 as its apices.

Moreover, where a sub-area is excluded as a modification target in the manner discussed earlier, the shift distance of the dividing points which correspond to the apices of the sub-area is set to zero. In this way, the sub-area excluded from the modification target is not modified. For example, where the sub-area having the dividing points D11, D21, D22, and D12 as its apices, indicated by hatching in FIG. 35, is to be excluded from the modification target, the amounts of shift in the H direction and the V direction by the dividing points D11, D21, D22, and D12 are set to zero in the dividing point shift table 420 of FIG. 34.

Figure 36:
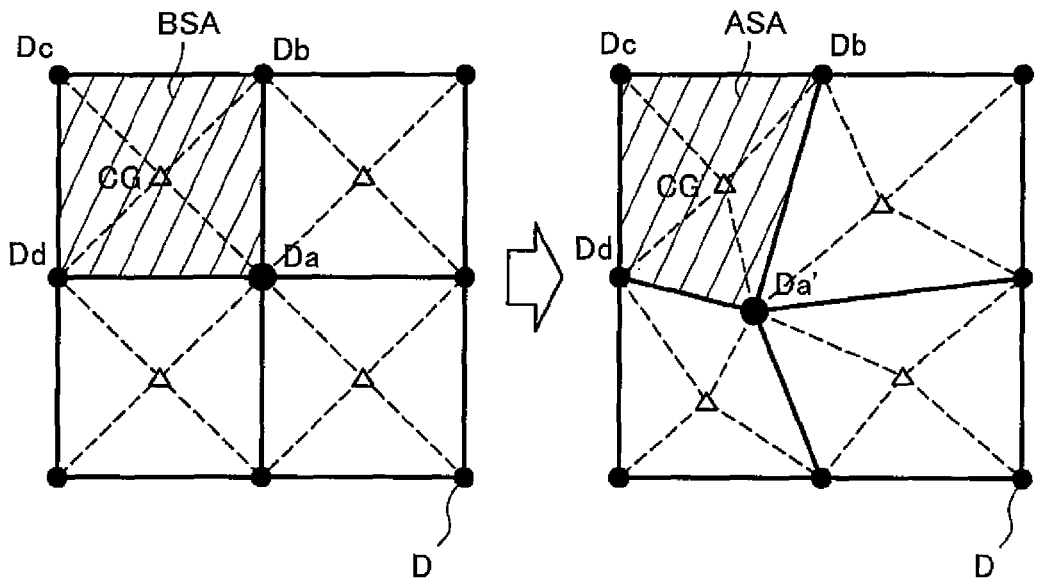
FIG. 36 is an illustration showing the concept of the image modification process method by the divided area modification module.

FIG. 36 is an illustration showing the concept of the image modification process method by the divided area modification module 260. In FIG. 36, the dividing points D are shown as black dots. In order to simplify the description, in FIG. 36, the condition of four sub-areas prior to position shift of the dividing points D is shown at left, and their condition after position shift of the dividing points D is shown at right, respectively. In the example of FIG. 36, the center dividing point Da shifts to the position of dividing point Da', while the positions of the other dividing points D do not shift. Thus, for example, the image of a rectangular sub-area having the dividing points Da, Db, Dc, Dd as its apices before shifting of the dividing points D (hereinafter also termed "before-modification sub-area of interest BSA") is modified to a rectangular sub-area having the dividing points Da', Db, Dc, Dd as its apices after shifting of the dividing points D (hereinafter also termed "after-modification sub-area of interest ASA").

The image modification process is carried out in triangular area units derived by dividing a rectangular sub-area into four triangular areas using the centroid GC of the sub-area. In the example of FIG. 36, the before-modification sub-area of interest BSA is divided into four triangular areas each having the centroid GC of the before-modification sub-area of interest BSA as one of its apices. Similarly, the after-modification sub-area of interest ASA is divided into four triangular areas each having the centroid GC' of the after-modification sub-area of interest ASA as one of its apices. An image modification process is then carried out on each of the corresponding triangular areas in their respective conditions before and after shift of the dividing point Da. For example, a triangular area having the dividing points Da and Dd and the centroid GC as its apices in the before-modification sub-area of interest BSA is modified to a triangular area having the dividing points Da' and Dd and the centroid GC' as its apices in the after-modification sub-area of interest ASA.

Figure 37:
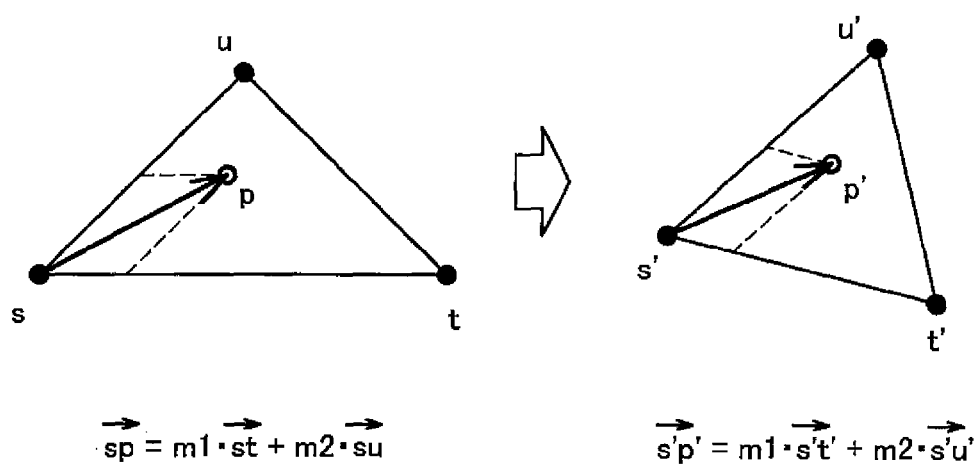
FIG. 37 is an illustration showing the concept of the modification process method of an image in a triangular area.

FIG. 37 is an illustration showing the concept of the modification process method of an image in a triangular area. In the example of FIG. 37, an image of a triangular area stu having points s, t, and u as apices is modified into an image of a triangular area s't'u' having points s', t', and u' as apices. Image modification is carried out by computing which pixel positions in the image of the modified triangular area s't'u' correspond to which positions in the triangular area stu prior to modification, and setting the pixel values at the computed positions in the pre-modification image (i.e. the source image) to the pixel values of the modified image.

For example, in FIG. 37, let it be assumed that the location of a pixel of interest p' in the image of the modified triangular area s't'u' corresponds to the location p in the image of the pre-modification triangular area stu. Computation of position p is carried out as follows. First, coefficients m1 and m2 are computed for representing the position of the pixel of interest p' in terms of the sum of a vector s't' and a vector s'u' as given by equation (1) below.

$$\overrightarrow{s'p'} = m1 \cdot \overrightarrow{s't'} + m2 \cdot \overrightarrow{s'u'} \qquad (1)$$

Next, using the coefficients m1 and m2 computed in this way, position p is derived by computing the sum of a vector st and a vector su in the pre-modification triangular area stu using equation (2) below.

$$\overrightarrow{sp} = m1 \cdot \overrightarrow{st} + m2 \cdot \overrightarrow{su} \qquad (2)$$

If the position p in the pre-modification triangular area stu coincides the pixel center position of the pre-modification image, the pixel value of the pixel in question is set to the pixel value of the modified image. On the other hand, If the position p in the pre-modification triangular area stu diverges from the pixel center position of the pre-modification image, a pixel value at position p is computed through an interpolation operation such as bi-cubic interpolation using pixel values of the pixels surrounding position p, and the computed pixel value is set to the pixel value of the modified image.

The image conversion process from the image of the triangular area stu to the image of the triangular area s't'u' can be carried out by computing pixel values in the above manner for the pixels in the image of the modified triangular area s't'u'. For each of the sub-areas in the modification area TA shown in FIG. 35, the divided area modification module 260 defines triangular areas and performs modification process in the manner described above, to carry out the image modification process on the modification area TA.

Figure 38:
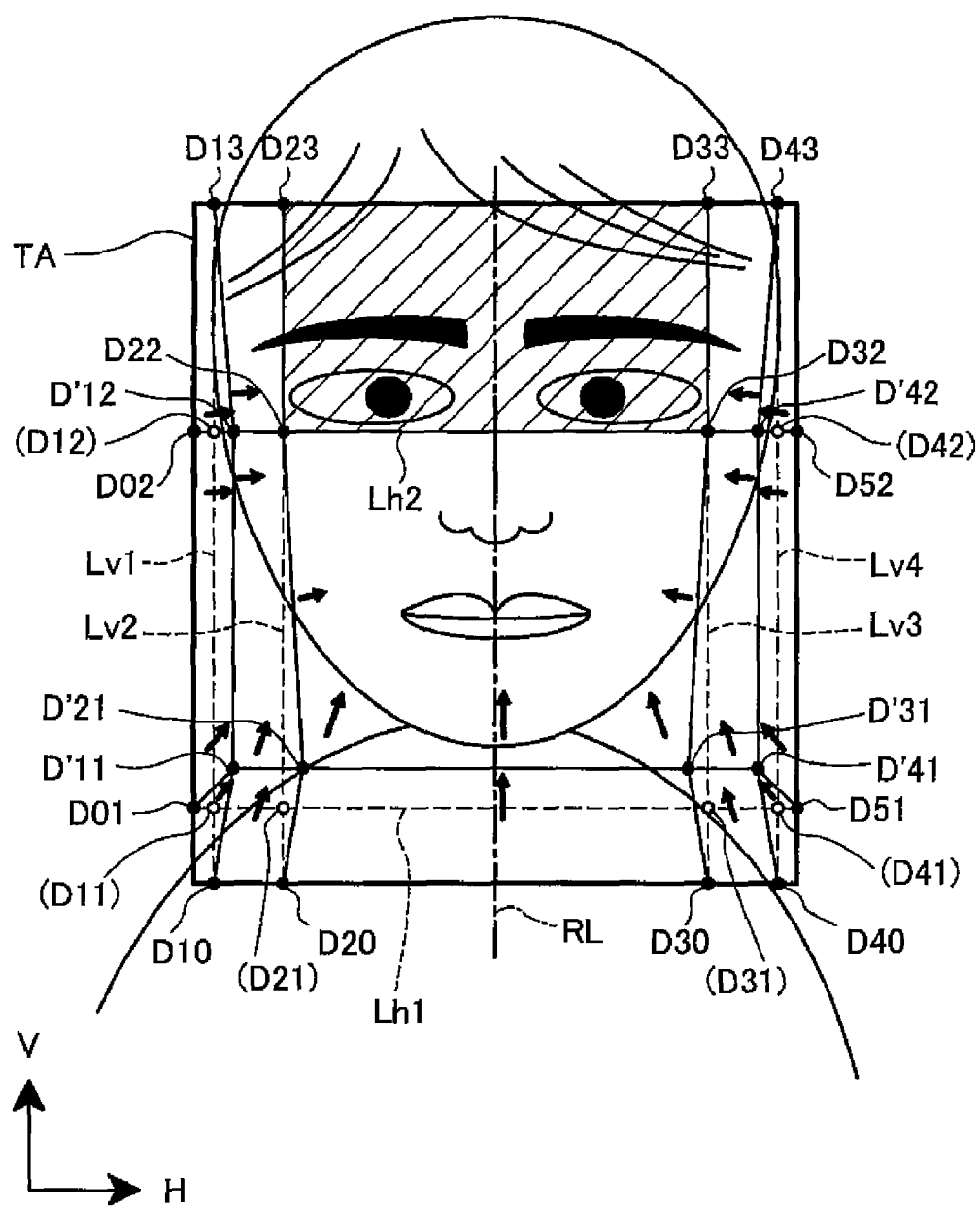
FIG. 38 is an illustration depicting an example of the pattern of facial shape correction.

Here, the pattern of facial shape correction is discussed in detail by taking the example of a case where the modification "TYPE A" (see FIG. 5) for facial sharpening is set as the modification type and the "Medium" extent is set as the degree of modification. FIG. 38 is an illustration depicting the pattern of facial shape correction in this case. In FIG. 38, modification patterns of the sub-areas constituting the modification area TA are shown by arrows.

In the example of facial shape correction depicted in FIG. 38, in relation to the direction perpendicular to the reference line RL (the V direction), the dividing points D (D11, D21, D31, D41) positioned on a horizontal dividing line Lh1 shift upward, while the dividing points D (D12, D22, D32, D42) positioned on a horizontal dividing line Lh2 do not shift (see FIG. 34). Consequently, the image situated between the horizontal dividing line Lh1 and the horizontal dividing line Lh2 is reduced in relation to the V direction. As noted, the horizontal dividing line Lh1 is positioned below the image of the chin, while the horizontal dividing line Lh2 is positioned just below the image of the eyes, and therefore through this facial shape correction the image of the area extending from the chin to below the eyes in the facial image is reduced in the V direction. As a result, the shape of the chin in the image shifts upward.

On the other hand, in relation to the direction orthogonal to the reference line RL (the H direction), the dividing points D (D11, D12) positioned on a vertical dividing line Lv1 shift rightward, while the dividing points D (D41, D42) positioned on a vertical dividing line Lv4 shift leftward (see FIG. 34). Furthermore, of two dividing points D positioned on a vertical dividing line Lv2, the dividing point D (D21) positioned on the horizontal dividing line Lh1 shifts rightward. Of two dividing points D positioned on a vertical dividing line Lv3, the dividing point D (D31) positioned on the horizontal dividing line Lh1 shifts leftward (see FIG. 34). Consequently, the image situated to the left side of the vertical dividing line Lv1 is enlarged towards the right side in relation to the H direction, while the image situated to the right side of the vertical dividing line Lv4 is enlarged towards the left side. Additionally, the image situated between the vertical dividing line Lv1 and the vertical dividing line Lv2 is reduced and shifted rightward in relation to the H direction, while the image situated between the vertical dividing line Lv3 and the vertical dividing line Lv4 is reduced and shifted leftward in relation to the H direction. Furthermore, the image situated between the vertical dividing line Lv2 and the vertical dividing line Lv3 is reduced in relation to the H direction, centered on the location of the horizontal dividing line Lh1.

As mentioned above, the vertical dividing lines Lv1 and Lv4 are positioned to the outside of the images of the cheek lines, while the vertical dividing lines Lv2 and Lv3 are positioned to the outside of the images of the corners of the eyes. Thus, facial shape correction carried out in the example of FIG. 38 results in images of areas to the outside of the corners of the eyes within the facial image being reduced overall in the H direction. The reduction rate is particularly high in proximity to the chin. As a result, the facial shape within the image becomes narrower overall in the width direction.

Where the modification pattern in the H direction and V direction are taken together, the overall effect of facial shape correction according to the example depicted in FIG. 38 is to sharpen the shape of the face within the target image TI. Sharpening of facial shape can also be expressed as "making the face look smaller."

Due to the method of placement of the horizontal dividing line Lh2 and the vertical dividing line Lv2 discussed earlier, the sub-area having the dividing points D22, D23, D33, D23 as its apices (the area shown with hatching) shown in FIG. 38 is an area including images of both eyes. As shown in FIG. 34, since the dividing points D22 and D32 do not shift in either the H direction or the V direction, the sub-area which includes images of both eyes is not modified. Thus, in the example of FIG. 38, a better image having more natural appearance subsequent to facial shape correction can be obtained by not performing modification for the sub-area which includes images of both eyes.

F. Variations

The present invention is not limited to the embodiments shown hereinabove and may be reduced to practice in various other forms without departing from the spirit thereof. Variations such as the following would be possible, for example.

F1. Variation 1:

In the preceding embodiments, in order to prevent the image from appearing unnatural subsequent to the modification process, modification is not carried out on overlapping sub-areas which overlie overlapping areas in which multiple modification areas overlap. In general, it is also acceptable to reduce the modification level of such overlapping areas. With this approach as well, the reduction of the modification level of overlapping areas allows to reduce image distortion at the perimeter of the overlapping areas, thereby preventing the image from appearing unnatural subsequent to the modification process.

F2. Variation 2:

In the preceding embodiments, the determination as to whether to carry out modification is made for each individual sub-area of the divided modification area. It is also acceptable to instead reduce the modification level of a portion of the modification area which contains overlapping areas. For example, of the dividing points used for dividing the modification area, shifting of those modification points which lie within overlapping areas may be suppressed. In this case as well, the level of modification of overlapping areas will be reduced, thus making it possible to reduce image distortion at the perimeter of the overlapping areas, and preventing the image from appearing unnatural subsequent to the modification process.

F3. Variation 3:

In the preceding embodiments, a facial shape-corrected printing process (FIG. 3) is described to be carried out entirely by a printer 100 as the image processing apparatus. The facial shape-corrected printing process, may be realized by a personal computer and the printer. In this case, the facial shape correction and corrected image display (Steps S100, S200) may be executed by the personal computer, and the printer may execute only the printing process (Step S300), for example. Moreover, the printer 100 is not limited to an ink-jet printer. A printer of some other type such as laser printer or sublimation printer may be used instead of the ink-jet printer.

F4. Variation 4:

Some of the arrangements realized through hardware in the preceding embodiments may be replaced by software, and conversely some of arrangements realized through software may be replaced by hardware.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
    a modification area establishing unit capable to establish a plurality of modification areas on a target image by analyzing the target image; and
    a modification processing unit that modifies an image within at least one of the plurality of modification areas, wherein
    each of the plurality of modification areas is established based on a human face in the target image, and
    the modification processing unit reduces a modification level for the at least one of the plurality of modification area areas in a case that a human face in one of the modification areas corresponding to one human face overlaps a human face in another one of the modification areas corresponding to another human face.

2. The image processing apparatus according to claim 1 wherein
    the modification processing unit carries out modification of the image within the at least one of the plurality of modification areas through modification of a plurality of sub-areas generated by dividing the at least one of the plurality of modification areas, and
    the modification processing unit reduces the modification level for a sub-area that overlaps a human face where an overlap occurs.

3. The image processing apparatus according to claim 1 wherein the modification processing unit sets the modification level of an area in which two human faces an overlap each other within the modification areas occurs to zero so as not to modify the area.

4. The image processing apparatus according to claim 1 wherein the modification area establishing unit establishes an area including images of a plurality of organs of each human face as each of the plurality of modification areas.

5. An image processing method comprising:
   (a) analyzing a target image and establishing a plurality of modification areas on the target image; and
   (b) modifying an image within at least one of the plurality of modification areas, wherein
   each of the plurality of modification areas is established based on a human face in the target image, and
   a modification level is reduced for the at least one of the plurality of modification area areas in a case that a human face in one of the modification areas corresponding to one human face overlaps a human face in another one of the modification areas corresponding to another human face.

6. The image processing method according to claim 5, further comprising:
   dividing the at least one of the plurality of modification areas into a plurality of sub-areas;
   modifying the image by modifying the plurality of sub-areas; and
   reducing the modification level for a sub-area that overlaps a human face where an overlap occurs.

7. The image processing method according to claim 5, further comprising:
   setting the modification level of an area in which two human faces an overlap each other within the modification areas occurs to zero so as not to modify the area.

8. The image processing method according to claim 5, further comprising:
   establishing an area including images of a plurality of organs of each human face as each of the plurality of modification areas.

9. A computer program product for image processing comprising:
   a non-transitory computer-readable medium; and
   a computer program stored on the non-transitory computer-readable medium that includes:
   a first computer program for causing a computer to analyze a target image and to establish a plurality of modification areas on the target image; and
   a second computer program for causing the computer to modify an image within at least one of the plurality of modification areas, wherein
   each of the plurality of modification areas is established based on a human face in the target image, and
   a modification level is reduced for the at least one of the plurality of modification area areas in a case that a human face in one of the modification areas corresponding to one human face overlaps a human face in another one of the modification areas corresponding to another human face.

10. The computer program product according to claim 9, wherein
    modification of the image is carried out within the at least one of the plurality of modification areas through modification of a plurality of sub-areas generated by dividing the at least one of the plurality of modification areas, and
    the modification level is reduced for a sub-area that overlaps a human face where an overlap occurs.

11. The computer program product according to claim 9, wherein the modification level of an area in which two human faces an overlap each other within the modification areas is occurs to zero so as not to modify the area.

12. The computer program product according to claim 9, wherein an area including images of a plurality of organs of each human face is established as each of the plurality of modification areas.

\* \* \* \* \*

UNITED STATES PATENT AND TRADEMARK OFFICE
CERTIFICATE OF CORRECTION

PATENT NO. : 8,285,065 B2
APPLICATION NO. : 12/118482
DATED : October 9, 2012
INVENTOR(S) : Akio Yamazaki It is certified that error appears in the above-identified patent and that said Letters Patent is hereby corrected as shown below:

Col. 28, line 49, Claim 1, please delete "area"
Col. 28, line 49, Claim 1, please delete "a human face in"
Col. 28, line 51, Claim 1, please delete "a human face in"
Col. 28, line 61, Claim 2, please delete "that overlaps a human face"
Col. 28, line 65, Claim 3, please delete "two human faces"
Col. 28, lines 65-66, Claim 3, please delete "each other within the modication areas"
Col. 29, line 13, Claim 5, please delete "area"
Col. 29, lines 13-14, Claim 5, please delete "a human face in"
Col. 29, line 15, Claim 5, please delete "a human face in"
Col. 29, lines 24-25, Claim 6, please delete "that overlaps a human face"
Col. 29, lines 28-29, Claim 7, please delete "two human faces"
Col. 29, lines 29-30, Claim 7, please delete "each other within the modification areas"
Col. 30, Claim 9, line 15, please delete "area"
Col. 30, Claim 9, lines 15-16, please delete "a human face in"
Col. 30, Claim 9, line 17, please delete "a human face in"
Col. 30, lines 26-27 (Claim 10, lines 7-8) please delete "that overlaps a human face"
Col. 30, lines 29-30 (Claim 11, lines 2-3) please delete "two human faces"
Col. 30, line 30 (Claim 11, line 3) please delete "each other within the modification areas is"

Signed and Sealed this
Twelfth Day of February, 2013

Teresa Stanek Rea
*Acting Director of the United States Patent and Trademark Office*